US008426003B2

(12) United States Patent
Habuta et al.

(10) Patent No.: US 8,426,003 B2
(45) Date of Patent: Apr. 23, 2013

(54) INFORMATION RECORDING MEDIUM, METHOD FOR MANUFACTURING THE SAME, AND RECORDING/REPRODUCING APPARATUS

(75) Inventors: Haruhiko Habuta, Osaka (JP); Noboru Yamada, Osaka (JP); Shigeru Furumiya, Osaka (JP)

(73) Assignee: Panasonic Corporation, Osaka (JP)

( * ) Notice: Subject to any disclaimer, the term of this patent is extended or adjusted under 35 U.S.C. 154(b) by 409 days.

(21) Appl. No.: 12/745,720

(22) PCT Filed: Dec. 4, 2008

(86) PCT No.: PCT/JP2008/003588
§ 371 (c)(1),
(2), (4) Date: Jun. 2, 2010

(87) PCT Pub. No.: WO2009/072285
PCT Pub. Date: Jun. 11, 2009

(65) Prior Publication Data
US 2010/0265811 A1 Oct. 21, 2010

(30) Foreign Application Priority Data
Dec. 4, 2007 (JP) .................................. 2007-313380

(51) Int. Cl.
*G11B 7/24* (2006.01)
(52) U.S. Cl.
USPC ..................... 428/64.1; 428/64.4; 430/270.11
(58) Field of Classification Search .................. 428/64.4; 430/270.11
See application file for complete search history.

(56) References Cited

U.S. PATENT DOCUMENTS 3,971,874 A   7/1976  Ohta et al.
4,624,914 A * 11/1986 Kimura et al. ........... 430/270.13
(Continued)

FOREIGN PATENT DOCUMENTS

CN   1200700     12/1998
JP   50-46317    4/1975
(Continued)

OTHER PUBLICATIONS

International Preliminary Report on Patentability and Written Opinion of the International Searching Authority issued Aug. 10, 2010 in International (PCT) Application No. PCT/JP2008/003588.
(Continued)

*Primary Examiner* — Elizabeth Mulvaney
(74) *Attorney, Agent, or Firm* — Wenderoth, Lind & Ponack, L.L.P.

(57) ABSTRACT

In an information recording medium including a substrate and an information layer having a recording layer, on and from which information is recorded and reproduced by laser beam application, the recording layer is made from a Te—O-$M_A$-$M_B$ material consisting of Te, O, $M_A$ (wherein $M_A$ is at least one element selected from Au and Pd) and $M_B$ (wherein $M_B$ is at least one element selected from Ag, Cu and Ni) with a content of Te of 10 atom % to 50 atom %, the content of O of 40 atom % to 70 atom %, the content of $M_A$ of 3 atom % to 15 atom %, and the content of $M_B$ of 3 atom % to 15 atom %. This constitution provides a low-cost information recording medium which enables high-density recording and stable reproduction of recorded data for a long period of term.

17 Claims, 5 Drawing Sheets

U.S. PATENT DOCUMENTS

| | | |
|---|---|---|
| 6,229,785 B1 | 5/2001 | Kitaura et al. |
| 8,007,887 B2 | 8/2011 | Habuta et al. |
| 2002/0022105 A1 | 2/2002 | Kitaura et al. |
| 2007/0154673 A1 | 7/2007 | Nishihara et al. |
| 2009/0239022 A1 | 9/2009 | Habuta et al. |
| 2009/0246558 A1 | 10/2009 | Nishihara et al. |
| 2009/0263613 A1 | 10/2009 | Habuta et al. |

FOREIGN PATENT DOCUMENTS

| | | |
|---|---|---|
| JP | 61-68296 | 4/1986 |
| JP | 62-88152 | 4/1987 |
| JP | 62-143240 | 6/1987 |
| JP | 63-175243 | 7/1988 |
| JP | 2002-133712 | 5/2002 |
| WO | 2006/051645 | 5/2006 |
| WO | 2007/052614 | 5/2007 |
| WO | 2007/063687 | 6/2007 |
| WO | 2007/123230 | 11/2007 |

OTHER PUBLICATIONS

Chinese Office Action issued May 2, 2012 in a Chinese application that is a foreign counterpart to the present application (with English translation).

International Search Report issued Jan. 20, 2009 in International (PCT) Application No. PCT/JP2008/003588.

Chinese Office Action issued Jul. 19, 2011 (with English translation) in a Chinese application that is a foreign counterpart to the present application.

* cited by examiner

INFORMATION RECORDING MEDIUM, METHOD FOR MANUFACTURING THE SAME, AND RECORDING/REPRODUCING APPARATUS

TECHNICAL FIELD

The present invention is related to an information recording medium on and from which information can be recorded and reproduced at high density and at a high speed using an optical means such as a laser beam application, and a method for producing the same and a recording and a reproducing apparatus therefor.

BACKGROUND ART

An optical information recording medium (for example, an optical disc) is known as a high-capacity recording medium on and from which information can be recorded and reproduced at a high speed. Recording information on this medium is conducted using the change of a recording material into a state which is optically distinguishable, which is caused by heat generated when the laser beam is applied to the recording material (which refers to a material constituting a recording layer). This recording medium has a major advantage that random access thereon is possible as needed and portability is excellent. For this reason, the importance thereof is recently increasing.

The optical information recording media which have been proposed include a rewritable medium on which information can be overwritten many times and a write-once medium on which information is written only once. The write-once medium can be produced with ease and provided at a low cost since the number of layers constituting the medium is generally smaller compared to the rewritable medium. Further, the write-once medium is advantageously used as a medium in which data that a user does not want anyone to destroy or erase is written since the data recorded on the write-once medium cannot be overwritten. For these reasons, there is large demand for the write-once medium which has long archival life and high reliability, as a medium for archival application. The write-once medium is used for, for example, recording and storing personal data and visual information by means of a computer, and is used widely in a medical field and an academic field. Further, the write-once medium is also used as an alternative for a home video tape.

Now the performances of the application and the visual information are higher and the market develops quickly, which involves the requirement for enhancement of the capacity of the write-once recording medium and production of the write-once recording medium at a lower cost.

The technique of enhancing the capacity of the optical information recoding medium is divided into two main classes. One is a technique for increasing the surface recording density by shortening the wavelength of a light source, increasing an NA of an objective lens, and by a superresolution recording. The other is a technique for increasing the number of recording layers in a thickness direction of the medium so as to increase the total surface recording area. Now, the capacity of the optical information recording medium is increasing by combining the both techniques.

Further, the cost required for producing the optical information recording medium depends on many production parameters such as the cost of the materials constituting the medium, the cost of a production apparatus, time required for producing the medium and a yield in the medium production. In particular, the cost of the optical information recording medium is largely affected by the cost of the material constituting the information layer. Of many kinds of elements existing in the earth, a noble metal such as Pd and Au is known as expensive material since prospects of them are small. For example, Pd is traded at about 1,200 yen per gram, and Au is traded at about 2,500 yen per gram at August, 2007. It can be said that these metals are very expensive considering that, for example, Cu is traded at 1 yen per gram. For this reason, it is preferable to reduce the usage of the noble metal as much as possible in order to realize a low-cost write-once recording medium.

The demand for the write-once medium is increasing rapidly with explosive sales of a DVD recorder. This is because the usage wherein the video recorded on a hard disk is stored in the write-once recording medium becomes common. Of course, it is presumed that the same usage will be employed by end users when using the next-generation DVD recorder. Thus, the low-cost write-once recording medium having a large capacity which is suitable for recording high-definition broadcast data is receiving attention.

The technique of recording information at a high density by means of laser beam and reproducing the recorded information by means of laser beam is known. As the recording medium used for recording and reproduction, a medium wherein a thin film of which main component is $TeO_x$ ($0<x<2$) which is a mixture of Te and $TeO_2$ is formed on a substrate is known (see Patent Literature 1). It is known that a Te—O—Pd recording material which is obtained by adding Pd to this $TeO_x$ to improve a recording speed and recording sensitivity makes a signal amplitude large sufficiently and makes the reliability of the medium very high (see Patent Literature 2). However, a content of Pd is 8 atom % to 35 atom % in the material described in Patent Literature 2. Using such a large amount of Pd makes it difficult to produce the low-cost write-once recording medium. Further, a constitution including a Te—O—Pd recording layer and a dielectric layer of which refractive index is 1.5 or more is reported (see Patent Literature 3). This constitution ensures a good C/N ratio in the write-once recording medium on which information is recorded with a blue-violet laser beam and makes it possible to increase the capacity of the medium.

The recording mechanism in the recording mediums wherein these Te—O—Pd-based recording materials is considered as follows. The Te—O—Pd thin film after film formation is a composite material wherein Te—Pd, Te or Pd is dispersed evenly in $TeO_2$. When the laser beam is applied for recording, Te, Te—Pd and Pd are melted and then larger crystal particles are deposited, whereby the optical state is changed and the difference in optical state between the portion which is irradiated with the laser beam and the portion which is not irradiated with the laser beam can be detected as a signal. Addition of Pd makes it possible to deposit the crystal particles more quickly and to increase the reliability of the recording medium.

[Patent Literature 1] Japanese Unexamined Patent Publication (kokai) S50-46317

[Patent Literature 2] Japanese Unexamined Patent Publication (kokai) S61-68296

[Patent Literature 3] Japanese Unexamined Patent Publication (kokai) 2002-133712

DISCLOSURE OF INVENTION

Problems to be Solved by Invention

The Te—O—Pd recording material contains Pd which is expensive as described above in a large amount. For this reason, it is difficult to realize the low-cost write-once recording medium. Further, it has been found that there is a problem that a reflectance of the write-once recording medium wherein Te—O—Pd recording material is used is reduced due to aging degradation and therefore the recorded information cannot be reproduced stably for a long period of time.

The present invention is made to solve these problems and the object of the present invention is to realize the recording medium which gives excellent signal quality because of suppression of reduction in reflectance due to the aging degradation, at a low cost. In other words, the object of the present invention is to provide a low-cost information recording medium on which information can be recorded at a high density and from which the recorded information can be stably reproduced for a long period of time and a method for producing the information recording medium.

Means to Solve the Problems

In order to achieve the object, the present invention provides an information recording medium including a substrate and an information layer having a recording layer, on and from which information is recorded and reproduced by irradiation of laser beam, wherein the recording layer includes a Te—O-$M_A$-$M_B$ material consisting of Te, O, $M_A$ (wherein $M_A$ is at least one element selected from Au and Pd) and $M_B$ (wherein $M_B$ is at least one element selected from Ag, Cu and Ni), and a content of Te atom is from 10 atom % to 50 atom %, the content of O atom is from 40 atom % to 70 atom %, the content of $M_A$ atom is from 3 atom % to 15 atom %, and the content of $M_B$ atom is from 3 atom % to 15 atom % in the Te—O-$M_A$-$M_B$ material. This information recording medium makes it possible to realize the low-cost information recording medium which shows no or suppressed reflectance reduction due to the aging degradation.

In the information recording medium of the present invention, the ratio of the content of $M_B$ atom to the total of the content of $M_A$ atom ($X_A$) and the content of $M_B$ atom ($X_B$) ($X_B/(X_A+X_B)$) in the Te—O-$M_A$-$M_B$ material is preferably from 0.25 to 0.75. This is because the reflectance reduction due to the aging degradation is further suppressed.

In the information recording medium of the present invention, $M_A$ atom which constitutes the Te—O-$M_A$-$M_B$ material is preferably Pd. This is because good signal quality is ensured upon high-speed recording.

In the information recording medium of the present invention, $M_B$ atom constituting the Te—O-$M_A$-$M_B$ material is preferably Cu. This is because good signal quality is ensured.

In the information recording medium of the present invention, a thickness of the recording layer is preferably from 2 nm to 50 nm. This is because good signal quality is ensured.

The information recording medium of the present invention may be one which includes two or more information layers. In this case, at least one information layer includes the recording layer containing the Te—O-$M_A$-$M_B$ material. This constitution makes it possible to ensure good signal quality in the at least one information layer.

The information recording medium of the present invention is preferably one on and from which information is recorded and reproduced using laser beam having a wavelength of from 350 nm to 500 nm. This is because the use of such laser beam makes it possible to record information at a high density.

Further, the present invention provides a method for producing the information recording medium of the present invention, wherein a step of forming the recording layer includes sputtering using a sputtering target containing a material consisting of Te, O, $M_A$ (wherein $M_A$ is at least one element selected from Au and Pd) and $M_B$ (wherein $M_B$ is at least one element selected from Ag, Cu and Ni) in an atmosphere containing a rare gas. This production method is suitable for producing the low-cost information recording medium which shows no or suppressed reflectance reduction due to the aging degradation.

Further, the present invention provides a method for producing the information recording medium of the present invention, wherein a step of forming the recording layer includes reactive sputtering using a sputtering target containing a material consisting of Te, $M_A$ (wherein $M_A$ is at least one element selected from Au and Pd) and $M_B$ (wherein $M_B$ is at least one element selected from Ag, Cu and Ni) in an atmosphere containing a mixed gas of a rare gas and oxygen. This production method is suitable for producing the low-cost information recording medium which shows no or suppressed reflectance reduction due to the aging degradation.

Effect of Invention

The information recording medium of the present invention is characterized in that the recording layer contains the above-mentioned Te—O-$M_A$-$M_B$ material consisting Te, O, $M_A$ (wherein $M_A$ is at least one element selected from Au and Pd) and $M_B$ (wherein MB is at least one element selected from Ag, Cu and Ni) as a main component and each atom is contained in a predetermined amount in the Te—O-$M_A$-$M_B$ material. This characteristic can provide, at a low cost, the information recording medium on which date can be recorded at a high density and from which the recorded data can be reproduced stably for a long period of time. Further, the method for producing the information recording medium according to the present invention makes it possible to produce the information recording medium which gives the effects described above.

Figure 1:
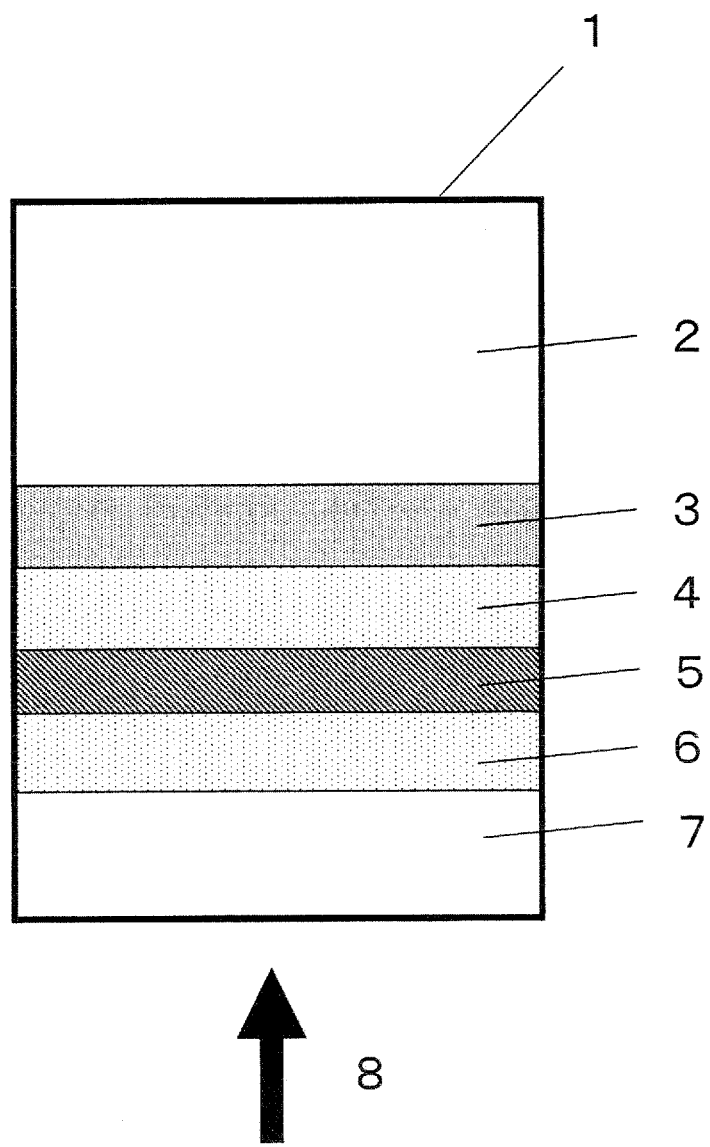
FIG. 1 is a cross-sectional view of a constitutional example of an information recording medium of the present invention.

1, 9, 24, 44, 64 information recording medium
2, 10, 25, 45 substrate
4, 12, 18, 27, 33, 38, 47, 52, 57 first dielectric layer
5, 13, 19, 28, 34, 39, 48, 53, 58 recording layer
7, 22, 42, 61 optical transparent layer
8, 23, 43, 45, 62, 65 laser beam
3, 11, 17, 26, 32, 46 reflective layer
6, 14, 20, 29, 35, 40, 49, 54, 59 second dielectric layer
15, 30, 50 first information layer
16, 31, 37, 51, 56 intermediate layer
21, 36, 55 second information layer
41 third information layer
60 "n"th information layer
63 recording and reproduction apparatus
66 objective lens
67 laser
68 photodetector
69 spindle motor

BEST MODE FOR CARRYING OUT THE INVENTION

Embodiments of the present invention are described with reference to drawings. It should be noted that the following embodiments are examples and the present invention is not restricted to the following embodiments. Further, in the following embodiments, identical parts or identical elements are denoted with identical reference numerals, and duplicate description may be omitted.

FIGS. 1, 2, 3 and 4 show examples of information recording mediums (which may be referred to as a "recording medium" or a "medium" hereinafter) according to the present invention, respectively.

The information recording medium 1 shown in FIG. 1 has a constitution wherein an information layer consisting of a reflective layer 3, a first dielectric layer 4, a recording layer 5, and a second dielectric layer 6 is provided on a substrate 2. In the illustrated embodiment, an optical transparent layer 7 (which may be referred to as a "cover layer" or a "protective layer") is formed on the information layer. Some or all of the reflective layer 3, the first dielectric layer 4, and the second dielectric layer 6 may be omitted as long as recording characteristics are not affected. As the number of the layers is smaller, the cost can be more reduced. Alternatively, an interface layer for preventing material transfer may be formed between the first dielectric layer 4 and the recording layer 5 and/or between the second dielectric layer 6 and the recording layer 5, if necessary. The recording and reproduction on this information recording medium are carried out by applying laser beam 8 from the optical transparent layer 7 side.

Figure 2:
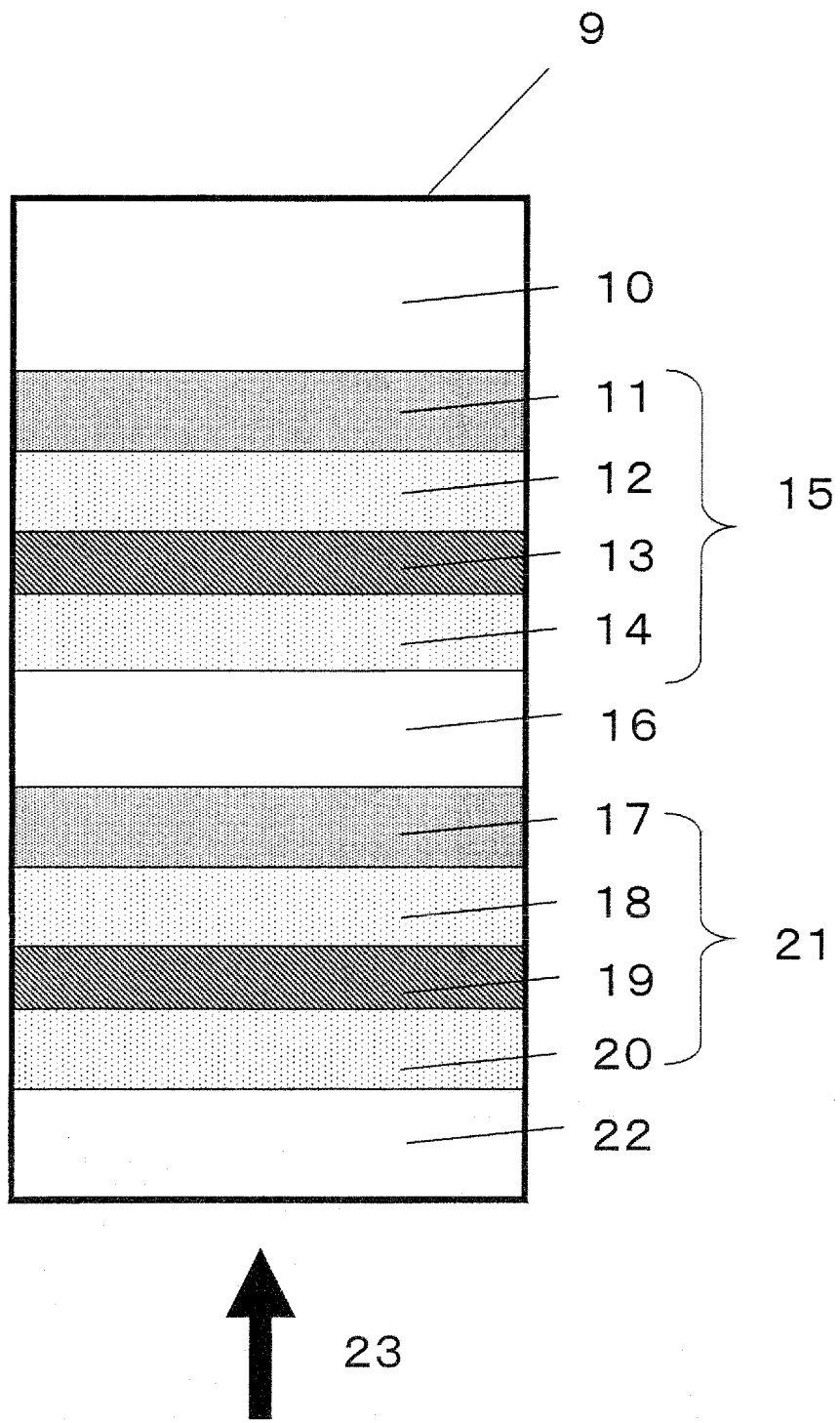
FIG. 2 is a cross-sectional view of a constitutional example of an information recording medium of the present invention.

The information recording medium 9 shown in FIG. 2 has a constitution wherein a first information layer 15 and a second information layer 21 are provided in this order on a substrate 10. An intermediate layer 16 is disposed between the two information layers to separate optically the information layers from each other, precluding unnecessary optical interference. Further, an optical transparent layer 22 is formed on the second information layer 21. The recording and reproduction on this information recording medium is carried out by applying laser beam 23 from the optical transparent layer 22 side. The recording and reproduction on the first information layer 15 is carried out using the laser beam which passes through the second information layer 21.

The first information layer 15 has a constitution wherein a reflective layer 11, a first dielectric layer 12, a recording layer 13 and a second dielectric layer 14 are stacked in this order in order to ensure both of high reflectance and high signal quality. The second information layer 21 comprises a reflective layer 17, a first dielectric layer 18, a recording layer 19, and a second dielectric layer 20 similarly to the first information layer. However, the thicknesses of the recording layer and the reflective layer may be smaller than those of those layers included in the first information layer in order to ensure both of high transmittance and high signal quality. Unless the recording characteristic and so on is affected, some or all of the reflective layers, the first dielectric layers and the second dielectric layers in the first and the second information layers may be omitted in order to reduce the cost.

Figure 3:
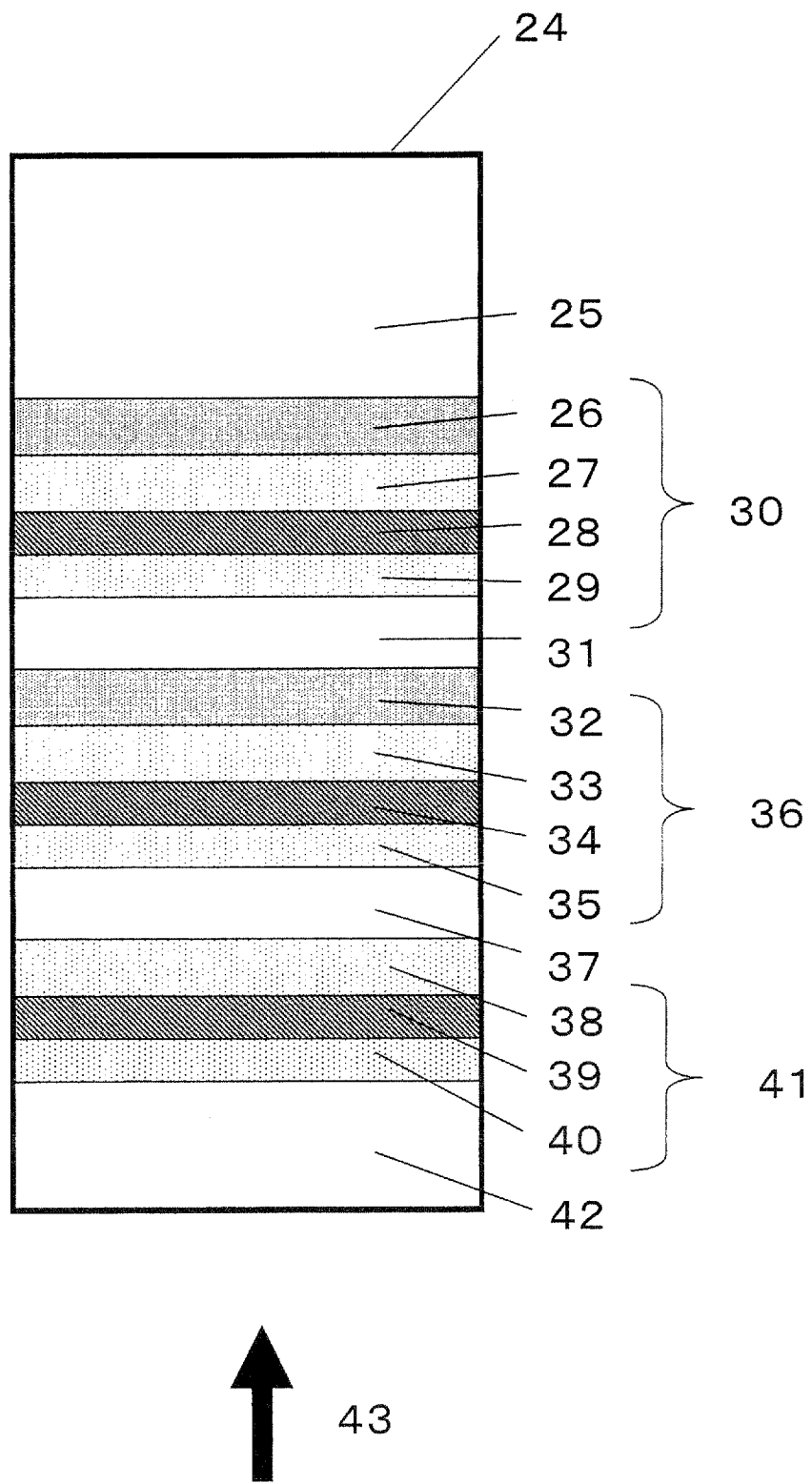
FIG. 3 is a cross-sectional view of a constitutional example of an information recording medium of the present invention.

The information recording medium 24 shown in FIG. 3 has a constitution wherein a first information layer 30, a second information layer 36 and a third information layer are provided in this order on a substrate 25. Intermediate layers 31 and 37 are disposed between the adjacent information layers respectively to separate optically the information layers from each other, precluding unnecessary optical interference. Further, an optical transparent layer 42 is formed on the third information layer 41. The recording and reproduction on this information recording medium is carried out by applying laser beam 43 from the optical transparent layer 42 side. The recording and reproduction on the first information layer 30 is carried out using the laser beam which passes through the second information layer 36 and the third information layer 41. The recording and reproduction on the second information layer 36 is carried out using the laser beam which passes through the third information layer 41.

The first information layer 30 has a constitution wherein a reflective layer 26, a first dielectric layer 27, a recording layer 28 and a second dielectric layer 29 are stacked sequentially in order to ensure both of high reflectance and high signal quality. The second information layer 36 comprises a reflective layer 32, a first dielectric layer 33, a recording layer 34, and a second dielectric layer 35 similarly to the first information layer. However, the thicknesses of the recording layer and the reflective layer may be smaller than those of those layers included in the first information layer in order to ensure both of high transmittance and high signal quality.

The third information layer 41 comprises a first dielectric layer 38, a recording layer 39 and a second dielectric layer 40 in order to ensure both of high transmittance and high signal quality. The third information layer 41 does not have the reflective layer differently from the first information layer 30 and the second information layer 36. This is because a transmittance of the third information layer 41 is made high.

Unless the recording characteristic and so on is affected, some or all of the reflective layers, the first dielectric layers and the second dielectric layers in the first and the second information layers may be omitted in order to reduce the cost. Alternatively, the reflective layer may be optionally formed in the third information layer in order to increase the signal quality.

Figure 4:
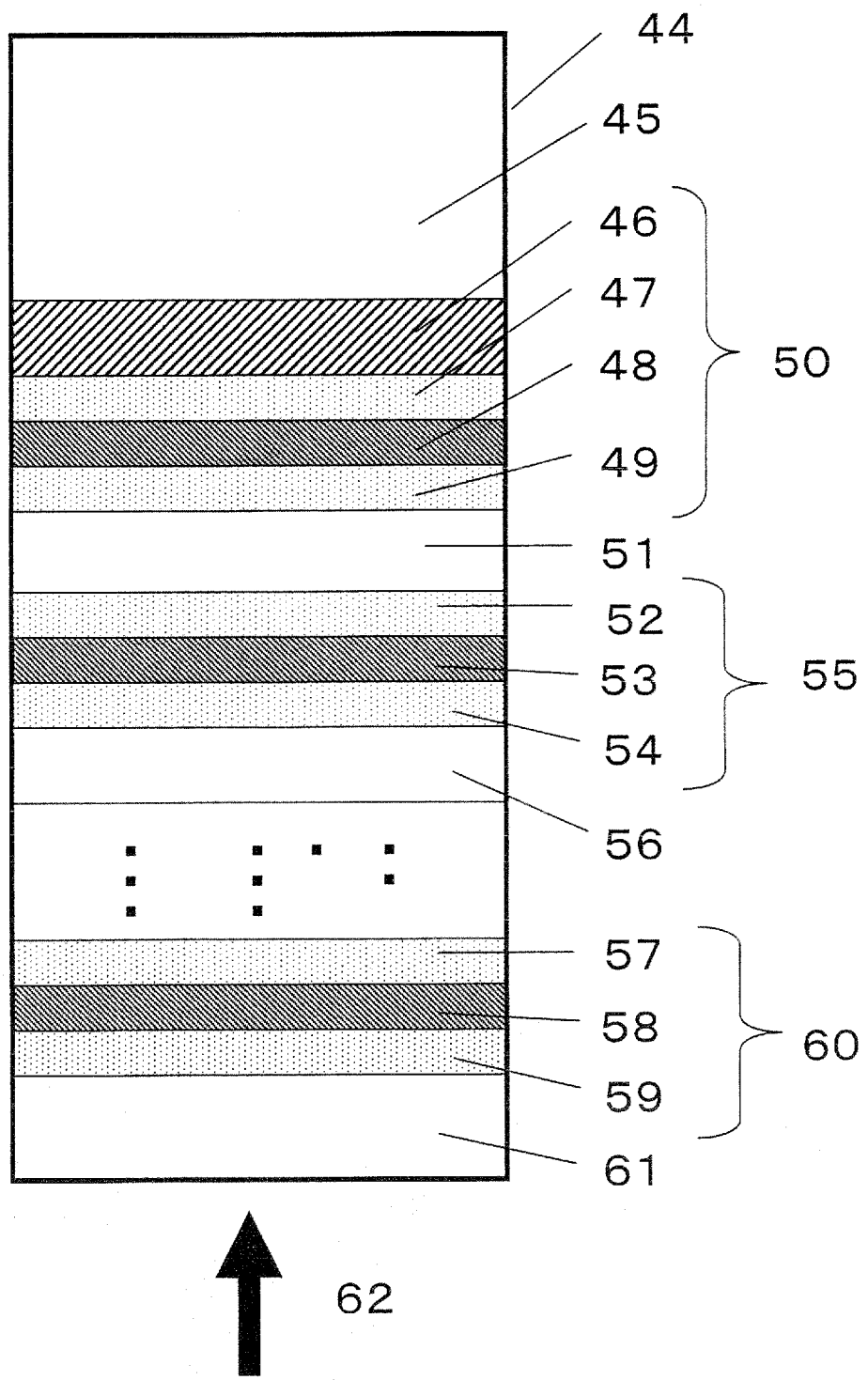
FIG. 4 is a cross-sectional view of a constitutional example of an information recording medium of the present invention.

The information recording medium 44 shown in FIG. 4 has a constitution wherein a first information layer 50, a second information layer 55, . . . and an "n"th information layer 60 (wherein n≧4) are provided on a substrate 25 in this order. Intermediate layers 51, 56, . . . are disposed between adjacent information layers to separate optically the information layers from each other, precluding unnecessary optical interference. The recording and reproduction on this information recording medium 44 is carried out by applying laser beam 62 from an optical transparent layer 61 side. The recording and reproduction on a "k"th information layer (wherein "k" is an integer of from 1 to (n-1)) is carried out using the laser beam which passes through from the "n"th information layer 60 to the "k+1"th information layer.

The first information layer 50 has a constitution wherein a reflective layer 46, a first dielectric layer 47, a recording layer 48 and a second dielectric layer 49 are stacked sequentially in order to ensure both of high reflectance and high signal quality. The second information layer 55 to the "n"th information layer 60 consist of first dielectric layers 52, . . . 57, recording layers 53, . . . 58 and second dielectric layers 54, . . . 59 in order to ensure both of high transmittance and high signal quality. A reflective layer may be optionally inserted between the first dielectric layer and the intermediate layer in order to enhance the signal quality. Unless the recording characteristic and so on is affected, some or all of the reflective layer, the first dielectric layer, and the second dielectric layer in each information layer may be omitted in order to reduce the cost.

The substrates 2, 10, 25 and 45 are transparent and disk-shaped. A polycarbonate resin, a polymethylmethacrylate resin, a polyolefin resin, a norbornene resin, an ultraviolet-curable resin (such as an epoxy resin or an acrylic resin), glass, or a combination thereof may be used as a material for the substrate. The thicknesses of the substrates 2, 10, 25 and 45 are not limited to particular ones, and may be from 0.01 mm to 1.5 mm.

The optical transparent layers 7, 22, 42 and 61 are transparent and disk-shaped. A material which has low optical absorptance at the wavelength of the laser beams 8, 23, 43 and 62 used and low optical birefringence in a short-wavelength region is preferably used as a material for the optical transparent layer. Specifically, a polycarbonate resin, a polymethylmethacrylate resin, a polyolefin resin, a norbornene resin, an ultraviolet-curable resin (such as an epoxy resin or an acrylic resin), glass, or a combination thereof may be used. Further, the thicknesses of the optical transparent layers 7, 22, 42 and are not limited to particular ones and may be from 0.01 mm to 1.5 mm.

When a numerical aperture of the objective lens used for recording and reproduction is 0.75 or more but 0.95 or less, the thicknesses of the substrates 2, 10, 25 and 45 are preferably in a range of 1.00 mm to 1.20 mm in order to maintain the strength of the recording medium during production. Further, the thicknesses of the optical transparent layers 7, 22, 42 and 61 are preferably in a range of 0.03 mm to 0.20 mm in order to reduce the allowable range of tilt.

On the other hand, when the numerical aperture is 0.55 or more but 0.75 or less, the thicknesses of the substrates 2, 10, 25 and 45 are preferably in a range of 0.50 mm to 0.70 mm and the thicknesses of the optical transparent layers 7, 22, 42 and 61 are preferably in a range of 0.50 mm to 0.70 mm.

A polycarbonate resin, a polymethylmethacrylate resin, a polyolefin resin, a norbornene resin, an ultraviolet-curable resin (such as an epoxy resin or an acrylic resin), glass, or a combination thereof may be used as a material for the intermediate layers 16, 31, 37, 51 and 56, similarly to the optical transparent layer.

The thicknesses of the intermediate layers 16, 31, 37, 51 and 56 are required to be equal to or more than a focal depth which is determined by the numerical aperture NA of the objective lens and the wavelength λ of the laser beam so that cross talk from another information layer is reduced when information is reproduced from any one of the first information layer, the second information layer, the third information layer and the "n"th information layer. Further, the thicknesses of the intermediate layers 16, 31, 37, 51 and 56 are required to be selected so that the entire thickness is in such a range that light can be focused on all the information layers. When three or more information layers are stacked, the thicknesses of the respective intermediate layers are preferably different from each other. This is because, if the thicknesses of the intermediate layers are the same, the information layers are placed at regular intervals and the laser beam to be used for recording and reproduction on a layer which is further from the laser beam (an "m"th layer) may be focused on a layer (an "m+2" layer) which is two layers down from the "m"th layer, which may increase the cross talk.

In a single information recording medium, pits or a guide groove for guiding the laser beam is preferably formed on the side where the information layer is positioned in any of the substrates 2, 10, 25 and 45, the optical transparent layers 7, 22, 42 and 61 and the intermediate layers 16, 31, 37, 51 and 56.

The recording layers 5, 13, 19, 28, 34, 39, 48, 53 and 58 are formed from a material which can take two or more states of which optical characteristics are different. The material for the recording layer of the write-once recording medium is preferably one which can irreversibly change from a certain state to another state of which optical characteristic is different from that of the certain state. In the present invention, a Te—O-$M_A$-$M_B$ material wherein $M_A$ is at least one element selected from Au and Pd and $M_B$ is at least one element selected from Ag, Cu and Ni is used as the recording material. When the recording material is formed from this material, a low-cost recording medium can be realized on which information can be recorded at high density and from which recorded data can be reproduced stably for a long period of time. Therefore, the Te—O-$M_A$-$M_B$ material is preferably applied to all of the recording layers of the recording mediums shown in FIGS. 1 to 4. However, if, for example, it is necessary to adjust recording sensitivity of each layer in a multi-layered recording medium, the layer which contains the Te—O-$M_A$-$M_B$ material and the layer which does not contain this material can coexist.

The low-cost recording medium which does not show reduction in reflectance due to the aging degradation can be realized by using at least one element selected from Au and Pd as $M_A$ atom and at least one element selected from Ag, Cu and Ni as $M_B$ atom in the Te—O-$M_A$-$M_B$ material. $M_A$ atom is more preferably Pd. This is because good signal quality is ensured upon the high-speed recording. $M_B$ atom is more preferably Cu. This is because good signal quality is ensured. In the following, the reason why the above-mentioned elements are selected as $M_A$ and $M_B$ which are added to $TeO_x$ is explained.

As the characteristics of a $TeO_x$ recording material (which does not contain an additional atom), it is known that the recording mark gradually changes by being irradiated with a weak laser for reproducing signals just after the information is recorded. The crystal structure of Te belongs to hexagonal system and a base lattice thereof is a coil-like chain lattice formed by covalent bond of Te—Te. The coils are cohered to each other by van der Waals force to form a hexagonal lattice. The chain structure of Te is maintained at a temperature which is relatively higher than a melting point thereof and has basically a coordination number of two. In the Te chain, portions which take the characteristics of covalent bond by van der Waals force between the chains are generated in spots and they become to have the coordination number of three to show tendency in increasing isotoropy. $TeO_x$ is heated to a temperature equal to or more than a melting point (the melting point of Te elementary substance is 450° C.) and then cooled quickly, the portions of three coordinate are frozen. These portions of three coordinate are very unstable in a solid state. It is considered that the recording mark is changed by the weak laser irradiation (which is referred to as "sensitization phenomenon" herein) in order to relax this strained state.

In order to prevent this sensitization phenomenon, addition of another material (element) to $TeO_x$ has been studied. One requirement for the additional material is that it does not bond to O (that is, does not become a matrix material as an oxide) and bonds to Te to form a stable crystal. Further, this crystal preferably has higher crystal structural symmetry compared to the Te elementary substance. This is because a crystal with high symmetry is resistant to show the above-mentioned sensitization phenomenon, and has a high crystallization speed.

In Table 1, an enthalpy of forming an oxide and a crystal structure of telluride of each of the representative additional materials are shown. Pd, Au, Ag, Cu and Ni have smaller absolute values of the enthalpies of forming oxides than that of Te, and therefore are resistant to form the oxides relatively. For this reason, it is considered that these atoms interact with Te, not entering into the $TeO_2$ matrix material when a thermal energy is applied thereto by the laser irradiation. On the other hand, it is considered that Bi easily enters into the $TeO_2$ matrix material since Bi has a larger enthalpy of forming oxide than that of Te and liable to form an oxide.

TABLE 1

| Element | Enthalpy of Forming Oxide [kJ/moll] | | Crystal Structure of Telluride | |
| --- | --- | --- | --- | --- |
| Pd | PdO | −85.4 | PdTe | cubic |
| Au | Au$_2$O$_3$ | −81.2 | AuTe$_2$ | monoclinic |
| Ag | Ag$_2$O | −31.1 | Ag$_2$Te | monoclinic |
| Cu | CuO | −157.3 | CuTe | orthorhombic |
|  | Cu$_2$O | −168.6 | Cu$_2$Te | cubic |
| Ni | NiO | −239.7 | NiTe | cubic |
| Bi | Bi$_2$O$_3$ | −573.88 | BiTe | cubic |
| Te | TeO$_2$ | −321.0 | Te | hexagonal closest packed |

Of these additional materials, Pd and Au are known as the additional materials of which crystallization speeds are high. For example, it is reported that the signal recorded at an eight-fold (8×) speed of the BD specification on the recording medium wherein a Te—O—Pd is used as the recording material has good signal quality. Pd and Au are, however, expensive and therefore it is preferable to reduce the usage of these elements in order to produce the information recording medium at a low cost. On the other hand, when the Pd amount is reduced in the conventional three-system Te—O—Pd recording material, the signal quality is deteriorated by irradiation of the laser beam having a power for reproducing the recorded data, which causes a problem that a large amount of laser power is required upon recording. This is practically undesirable. Further, phenomenon of reduction in reflectance due to the aging degradation occurs irrespective of the added amount of Pd, and a problem that the recorded data cannot be reproduced stably for a long period of time has been found.

In the present invention, a quaternary material consisting of Te, O, $M_A$ and $M_B$ wherein $M_A$ is at least one element selected from Au and Pd and $M_B$ is at least one element selected from Ag, Cu and Ni is used in order to comply with the requirements (1) high-speed recording, (2) low cost, (3) recording sensitivity, (4) read stability and (5) archival reliability.

The recording mechanism in the recording layer containing the Te—O-$M_A$-$M_B$ material is considered as follows. The Te—O-$M_A$-$M_B$ thin film after film formation is a composite material wherein Te-$M_A$, Te-$M_B$, Te, $M_A$ and $M_B$ are dispersed as microparticles evenly in TeO$_2$. Te-$M_A$, Te-$M_B$, Te, $M_A$ and $M_B$ are melted by irradiation of the laser beam for recording and then larger crystal particles are deposited. This changes the optical state of the Te—O-$M_A$-$M_B$ material and the difference in the optical state between the portion irradiated with the laser beam and the portion not irradiated with the laser beam can be detected as the signal. The crystal particles can be deposited more quickly and high reliability can be ensured by adding Pd or Au in a proper amount. Further, the recording sensitivity can be improved by adding at least one element selected from Ag, Cu and Ni in a proper amount.

When the recording layers 5, 13, 19, 28, 34, 39, 48, 53 and 58 contain the Te—O-$M_A$-$M_B$ material, the total of the four types of atoms (Te, O, $M_A$ and $M_B$) preferably occupies 80% or more of all the atoms contained in the recording layer. In the case where the total content of the four types of atoms is less than 80 atom % (that is, the content of the atoms which do not constitute the Te—O-$M_A$-$M_B$ material is over 20 atom %) in the recording layer, the effect due to the use of the Te—O-$M_A$-$M_B$ material cannot be obtained. In other words, the Te—O-$M_A$-$M_B$ material is required to be contained as a main component in the recording layer.

In the Te—O-$M_A$-$M_B$ material contained in the recording layers 5, 13, 19, 28, 34, 39, 48, 53 and 58, the content of Te atom is from 10 atom % to 50 atom %, the content of O atom is from 40 atom % to 70 atom %, the content of $M_A$ atom is from 3 atom % to 15 atom %, and the content of $M_B$ atom is from 3 atom % to 15 atom %. The content of $M_A$ atom is more preferably from 3 atom % to 10 atom % and the content of $M_B$ atom is more preferably from 3 atom % to 10 atom % in this Te—O-$M_A$-$M_B$ material. In particular, when $M_A$ atom is Pd, the content of Pd is more preferably from 3 atom % to 5 atom %.

The reason why the content of each atom is in the above-mentioned range in the Te—O-$M_A$-$M_B$ material is described in the following.

In the case where the content of Te atom is too low in the Te—O-$M_A$-$M_B$ material, the amount of TeO$_2$ contained in the the recording layers 5, 13, 19, 28, 34, 39, 48, 53 and 58 is small and sufficient humidity resistance and good contrast cannot be obtained as described below. Further, in the case where an amount of Te that does not bond to O is small, good contrast cannot be obtained. In the case where the content of Te atom is over 50 atom %, the recording mark is liable to deteriorate by the laser beam for reproduction after the signal is recorded. Therefore, the content of Te atom is from 10 atom % to 50 atom %.

Most of O atoms in the recording layer bond to Te to form TeO$_2$. This TeO$_2$ serves to makes the humidity resistance higher. As the content of TeO$_2$ is higher, the recording layer shows more excellent humidity resistance. Further, when the amount of TeO$_2$ is too small, a thermal conductivity becomes high, whereby thermal diffusion in a plane of the recording layer is increased and thereby good contrast is difficult to be obtained. For this reason, the content of O atom is preferably 40 atom % or more. However, in the case where the amount of TeO$_2$ is large, the contents of Te, $M_A$ and $M_B$ become relatively low. As a result, the absorption efficiency of laser beam is lowered and thereby the recording sensitivity is deteriorated. Further, the amount of change in reflectance before and after recording becomes small and thereby good signal quality cannot be obtained. For this reason, the content of O atom is preferably 70 atom % or less. Accordingly, the content of O atom is from 40 atom % to 70 atom %.

$X_O/X_{Te}$ wherein $X_{Te}$ is the content of Te atom and $X_O$ is the content of O atom in the Te—O-$M_A$-$M_B$ material is preferably from 1.1 to 1.6. In the case where $X_O/X_{Te}$ is less than 1.1, good contrast may not be obtained. In the case where $X_O/X_{Te}$ is over 1.6, the recording sensitivity may decrease.

In the case where the content of $M_A$ atom is less than 3 atom % in the Te—O-$M_A$-$M_B$ material, crystal nuclei of PdTe (when $M_A$=Pd) or Au$_2$Te (when $M_A$=Au) are reduced in the recording layers 5, 13, 19, 28, 33 and 38. In the case where the amount of these crystal nuclei is low, it is difficult to crystallize the recording layer at a high speed. Further, in the case where the content of $M_A$ atom is low, there is a problem that the recording mark deteriorates by being irradiated with reproduction beam after the signal is recorded. On the other hand, in the case where the content of $M_A$ atom is over 15 atom %, the change in reflectance before and after recording is reduced, which makes it difficult to ensure good signal quality. Accordingly, the content of $M_A$ atom is from 3 atom % to 15 atom %. Further, when the content of $M_A$ atom is in a range of from 3 atom % to 10 atom %, the difference in reflectance between the amorphous portion and the crystal is sufficiently large, whereby good signal quality is easy to be obtained. Furthermore, when the $M_A$ atom is Pd and the content of Pd is from 3 atom % to 5 atom %, good signal quality can be obtained even if the high-density recording is conducted.

In the case where the content of $M_B$ atom in the Te—O—$M_A$-$M_B$ material is less than 3 atom %, the absorption efficiency of the laser beam absorption efficiency of the recording layers 5, 13, 19, 28, 33 and 38 is lowered, and the recording sensitivity deteriorates. On the other hand, the content of $M_B$ atom is over 15 atom %, the change in reflectance before and after recording is lowered, and therefore it is difficult to ensure good signal quality. Accordingly, it is preferable that the content of $M_B$ atom is from 3 atom % to 15 atom %. Further, when the amount of $M_B$ atom is in a range of from 3 atom % to 10 atom %, the difference in reflectance between the amorphous portion and the crystal is sufficiently large, and thereby good signal quality is easy to be obtained.

The ratio of the content of $M_B$ atom to the sum of the content of $M_A$ atom ($X_A$) and the content of $M_B$ atom ($X_B$) in the Te—O-$M_A$-$M_B$ material ($X_B/(X_A+X_B)$) is preferably from 0.25 to 0.75. In the case where $X_B/(X_A+X_B)$ is less than 0.25, the reduction in reflectance due to the aging degradation is observed. In the case where $X_B/(X_A+X_B)$ is over 0.75, the increase in reflectance due to the aging degradation is observed. The change (reduction or increase) in reflectance due to the aging degradation is preferably suppressed from the view point of using the medium stably for a long period of time. $X_B/(X_A+X_B)$ is more preferably from 0.375 to 0.625.

The thicknesses of the recording layers 5, 13, 19, 28, 34, 39, 48, 53 and 58 is preferably from 2 nm to 50 nm. This is because the thickness of 2 nm or more facilitates formation of a continuous layer of the recording material (that is, the recording material is difficult to form an island structure), whereby a sufficient C/N ratio can be obtained. Further, in the case where the thickness is 50 nm or more, the C/N ratio is lowered since the thermal diffusion in the plane of the recording layer is large. The thickness of the recording layer 19 is preferably from 2 nm to 30 nm since the information layer (the second information layer) which is positioned on the incident laser beam side in the information recording medium having two information layers as shown in FIG. 2 is required to have a high transmittance. Further, the thicknesses of the recording layers 34, 39, 53 and 58 are preferably from 2 nm to 20 nm since the information layer which is positioned on the incident laser beam side (for example, the second information layer 36 and the third information layer 41 in FIG. 3, the second information layer 55 and the "n"th information layer 60 in FIG. 4) in the information recording medium having three or more information layers as shown in FIGS. 3 and 4 is required to have a still higher transmittance.

Further, the recording layers 5, 13, 19, 28, 34, 39, 48, 53 and 58 may have a construction wherein a film containing Te—O as a main component and a film containing $M_A$ and $M_B$ as a main component are stacked alternately. In this case, the mixing ratio of Te—O, $M_A$ and $M_B$ is easily adjusted by fine adjustment of the thickness of each layer even though the number of the steps for forming the recording layer is increased. Accordingly, such a stacked structure may be employed as needed.

The recording layers 5, 13, 19, 28, 34, 39, 48, 53 and 58 may contain an element(s) other than Te, O, $M_A$ and $M_B$ (wherein $M_A$ is at least one element selected from Au and Pd, and $M_B$ is at least one element selected from Ag, Cu and Ni). For example, at least one element selected from S, N, F, B and C may be added for the purpose of adjusting the thermal conductivity or the optical constant, or increasing the thermal resistance and the environmental reliability. The content of these elements is preferably 20 atom % or less of the entire recording layer.

The main purposes of providing the first dielectric layers 4, 12, 18, 27, 33, 38, 47, 52 and 57 and the second dielectric layers 6, 14, 20, 29, 35, 40, 49, 54 and 59 are protection of the recording material, and adjustment of the optical characteristic so as to enable the effective optical absorption in the information layer. The first dielectric layer and the second dielectric layer are formed so that a sulfide such as ZnS; a selenide such as ZnSe; an oxide such as Si—O, Al—O, Ti—O, Ta—O, Zr—O, Cr—O, Zn—O and Sb—O; a nitride such as Ge—N, Cr—N, Si—N, Al—N, Nb—N, Mo—N, Ti—N, Zr—N and TaN; a nitride oxide such as Ge—O—N, Cr—O—N, Si—O—N, Al—O—, Nb—O—N, Mo—O—N, Ti—O—N, Zr—O—N and Ta—O—N; a carbide such as Ge—C, Cr—C, Si—C, Al—C, Ti—C, Zr—C and Ta—C; a fluoride such as Si—F, Al—F, Ca—F, La—F and Mg—F; and a combination thereof (for example, ZnS—$SiO_2$) is contained as a main component (for example, in an amount of 80 mol % or more).

Both of the thicknesses of the first dielectric layer and the second dielectric layer are preferably from 1 nm to 100 nm. This is because a sufficient C/N ratio is easy to be obtained in the recording and reproduction characteristic. In the case where the thickness of the dielectric layer is less than 1 nm, the recording layer is not sufficiently protected. In the case where the thickness of the dielectric layer is 100 nm or more, the film formation requires more time, which is not preferable in productivity.

The reflective layers 3, 11, 17, 26, 32 and 46 are provided for obtaining heat dissipation effect and optical effect which enables the effective optical absorption in the recording layer. A metal such as Au, Ag, Cu, Al, Cr and Ti or an alloy of two or more metals selected from these metals is used as the material for the reflective layer. When the wavelength of the laser beams 8, 23, 43 and 62 is from 350 nm to 500 nm, an Ag alloy or an Al alloy is preferably used to ensure a sufficient reflectance. Ag—Pd—Cu, Ag—Ga—Cu, Ag—Bi, Al—Cr or Al—Ni is more preferably used from the viewpoints of heat dissipation and humidity resistance. The thickness of the reflective layer is preferably 1 nm or more. In the case where the thicknesses of the reflective layers 3, 11, 17, 26, 32 and 46 are less than 1 nm, the reflective layer does not become a uniform layer, resulting in failure to obtain sufficient thermal and optical effects.

The present invention is not limited to the information recording mediums 1, 9, 24 and 44 shown in FIGS. 1, 2, 3 and 4, and can be applied to various constitutions. For example, in the illustrated information recording mediums, the reflective layers 3, 11, 17, 26, 32 and 46, the first dielectric layers 4, 12, 18, 27, 33, 38, 47, 52 and 57, or the second dielectric layers 6, 14, 20, 29, 35, 40, 49, 54 and 59 may not be provided as appropriate, for reducing the cost.

For example, although the information recording medium shown in FIG. 2 has a constitution wherein both of the two information layers 15 and 21 have the reflective layers, one of the information layers may have a constitution not having the reflective layer for the purpose of reducing the cost and/or improving the transmittance. Although the information recording medium shown in FIG. 4 has a constitution wherein only the first information 50 has the reflective layer 46, the second information layer 55 to the "n"th information layer 60 may have the reflective layer, or the first information layer 50 may have a constitution not having the reflective layer 46.

In general, the transmittance of the information layer is reduced by providing the reflective layer, but high signal quality can be easily obtained because of the heat dissipation effect and the optical effect of the reflective layer. For this reason, it is necessary to optimally decide whether or not the reflective layer is provided in the second information layer 21 in FIG. 2, the second information layer 36 in FIG. 3, the second information layer 55 to the "n"th information layer 60 in FIG. 4, which are placed on the laser beam entry side. When the reflective layer is provided, it is necessary to design the reflective layer by making the reflective layer very thin (for example, 10 nm or less) so as to maintain high reflectance of the information layer. The preferable ranges of the refractive index n and the extinction coefficient k of the reflective layer are less than 2.0 and 2.0 or more, respectively.

Further, the present invention may be applied to the recording medium having a constitution wherein the second dielectric layer, the recording layer, the first dielectric layer and the reflective layer are stacked on the substrate in this order and a dummy substrate is bonded as the optical transparent layer. The recording and reproduction on such a recording medium is conducted by applying the laser beam from the substrate side.

When the Te—O-$M_A$-$M_B$ material of the present invention is applied in the layer on the laser beam entry side (for example, the second information layer 21 in FIG. 2) in the multilayered recording medium as shown in FIGS. 2 to 4, more excellent contrast is obtained compared to the conventional Te—O—Pd recording material and thereby more excellent signal quality is ensured.

Each thin film constituting the above-mentioned information layer may be formed by, for example, a vapor thin-film deposition method such as a vacuum deposition method, a sputtering method, an ion plating method, a CVD (Chemical Vapor Deposition) method, an MBE (Molecular Beam Epitaxy) method.

Next, a method for producing the information recording medium of the present invention is described. The order of forming each layer in the information recording medium shown in FIG. 1 is forming the reflective layer 3, the first dielectric layer 4, the recording layer 5 and the second dielectric layer 6 on the substrate 2 in this order, and then the optical transparent layer 7 is formed on the top. The optical transparent layer 7 may be formed by bonding a substrate (for example, a plate, a sheet, or a film) having an adhesive resin on one side to the medium wherein the layers up to the second dielectric layer 6 are formed. Alternatively, the optical transparent layer 7 may be formed by bonding the medium wherein the layers up to the second dielectric layers 6 are formed to a sheet-like substrate with an ultraviolet curable resin. Alternatively, the optical transparent layer may be formed by applying the ultraviolet curable resin to the medium wherein the layers up to the second dielectric layer 6 are formed by a spin coat method and curing the resin with an ultraviolet ray.

Similarly, the information medium shown in FIGS. 2, 3 and 4 can be produced by carrying out the film formation steps, and the steps for forming the intermediate layer and the optical transparent layer. The intermediate layer can be formed by the spin coat method using the ultraviolet curable resin. Alternatively, the intermediate layer can be formed by bonding a sheet-like substrate.

The recording layer containing the Te—O-$M_A$-$M_B$ material is preferably formed by sputtering. The sputtering is preferably carried out any of the following two methods.

In the first method, the sputtering is conducted using a sputtering target containing a material consisting of Te, O, $M_A$ (wherein $M_A$ is at least one element selected from Au and Pd) and $M_B$ (wherein $M_B$ is at least one element selected from Ag, Cu and Ni) in an atmosphere containing a rare gas. This sputtering method employs a target of which composition is identical or similar to that of the Te—O-$M_A$-$M_B$ material to be contained in the recording layer. The atmosphere gas containing the rare gas (which may be referred to as a "film formation gas") contains the rare gas in an amount of 80% or more by volume. The rare gas may be any one of an Ar gas, a Kr gas and a Xe gas. In the first method, the sputtering is preferably conducted using a direct current (DC) power source.

In the second method, the sputtering is conducted using a sputtering target containing a material consisting of Te O, $M_A$ (wherein $M_A$ is at least one element selected from Au and Pd) and $M_B$ (wherein $M_B$ is at least one element selected from Ag, Cu and Ni) in an atmosphere containing a mixed gas of a rare gas and oxygen. Accordingly, a reactive sputtering is conducted in the second method. The recording layer formed by this sputtering method, Te atom, $M_A$ atom and $M_B$ atom are supplied from the sputtering target consisting of the Te-$M_A$-$M_B$ material and oxygen is supplied from the atmosphere gas. The atmosphere gas preferably contains the mixed gas of the rare gas and oxygen in an amount of 80% or more by volume. Adjustment of the ratio of the oxygen gas makes it possible to adjust the content of oxygen contained in the recording layer. The atmosphere gas may contain the oxygen gas in an amount of, for example, 0.1% to 70% by volume.

In the first and the second methods, two different sputtering targets (for example, a sputtering target consisting of Te—O and a sputtering target consisting of $M_A$-$M_B$ in the first method, and a sputtering target consisting of Te and a sputtering target consisting of $M_A$-$M_B$ in the second method) are sputtered simultaneously.

A low-cost information recording medium on which information can be recorded at a high density and from which the recorded data is reproduced stably for a long period of term can be obtained by forming the recording layer according to any one of these methods.

Next, examples of a recording and reproduction apparatus and a recording and reproduction method for the information recording medium of the present invention are described.

Figure 5:
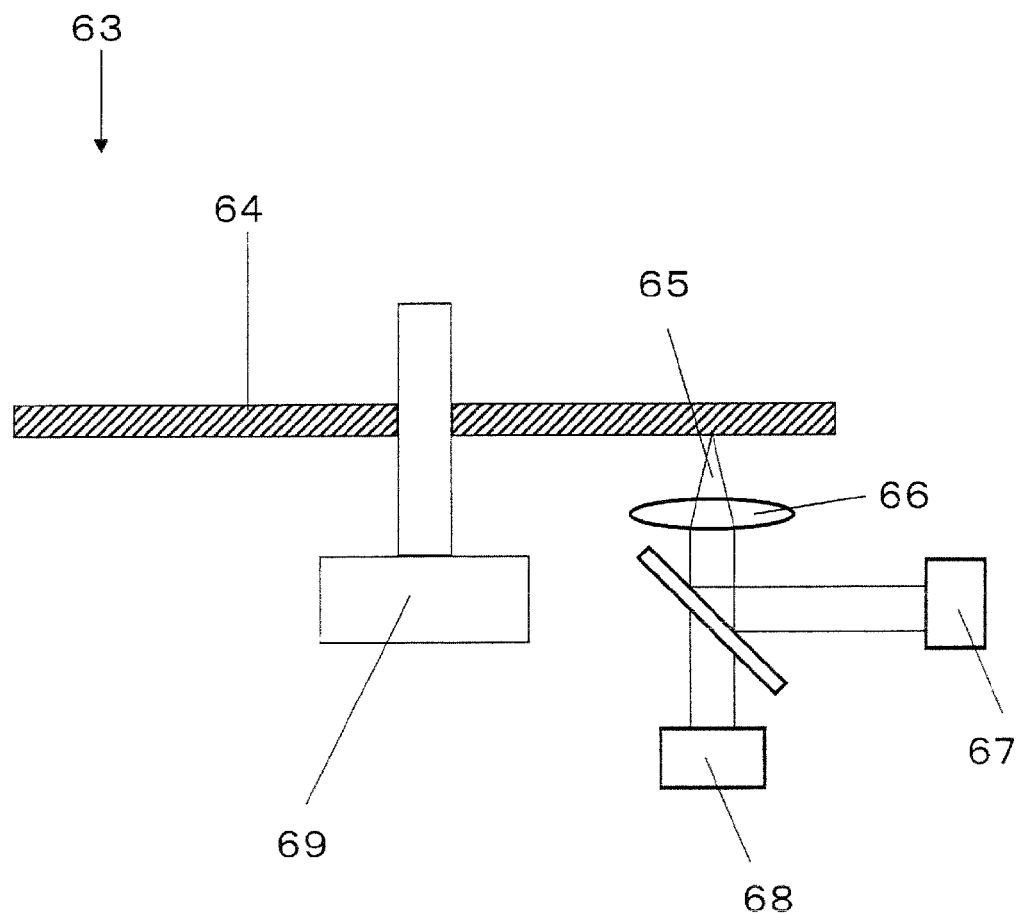
FIG. 5 schematically shows a part of a constitution of a recording and reproduction apparatus used for recording and reproduction on the information recording medium of the present invention.

A schematic view of an example of an apparatus used for recording and reproducing on an optical disc is shown in FIG. 5. For recording and reproducing signal, a recording and reproduction apparatus is used which is provided with an optical head (not shown) equipped with an objective lens 66 which focuses laser beam and a laser 67, a drive (not shown) which guides a position where the laser beam is applied, to a predetermined position, a focusing controlling unit (not shown) and a tracking controlling unit (not shown) for controlling the position in a track direction and a direction vertical to a film surface, a laser drive (not shown) for modulating a laser power and a spindle motor 69 for rotating the medium.

The recording of signal is carried out by rotating the medium with the spindle motor 69, narrowing the laser beam to a micro spot by means of the optical system (that is, the objective lens) and irradiating the medium with the laser beam. The portion which is irradiated with the laser beam forms the recording mark. The reproduction of signal is carried out by applying the laser beam and reading the signal from the medium by means of a photodetector 68. The power level P1 used for reproduction of signal is selected so that it is lower than the power level P2 used for recording of signal and the laser irradiation with that power level P1 does not affect the optical state of the recording mark and gives a sufficient amount of light from the medium to reproduce the recording mark.

The wavelength of the laser beam used for recording and reproduction is preferably 350 nm or more but 500 nm or less. For example, the use of the laser beam having a wavelength of 405 nm and a lens having a NA of 0.85 can realize high-density recording of 23 GB to 35 GB per information layer in the information recording medium having a diameter of 12 cm. Alternatively, the use of the laser light having a wavelength of 405 nm and a lens having a NA of 0.65 can realize high-density recording of 15 GB to 20 GB per information layer in the information recording medium having a diameter of 12 cm.

EXAMPLES

Next, the present invention is described in detail by examples.

Example 1

In Example 1, the effect on the C/N ratio and the read stability by the composition of the recording layer was investigated when the Te—O—Pd—Cu material was used as the recording material. A plurality of information recording mediums with different compositions of recording layers were manufactured as samples and evaluated. The details thereof are described below.

In this example, the information recording medium 1 having a constitution shown in FIG. 1 was manufactured. A substrate of a polycarbonate resin was used as the substrate 2. The substrate had a diameter of 12 cm and a thickness of 1.1 mm and a guide groove on one surface. The guide groove had a groove pitch of 0.32 μm (a distance between the centers of adjacent grooves) and a groove depth of 20 nm.

An AgPdCu reflective layer having a thickness of 80 nm was formed on the groove-formed surface of the substrate 2 by sputtering using an AgPdCu (weight ratio of 98.1:0.9:1.0) target. Next, a $ZrO_2$—$SiO_2$—$Cr_2O_3$—$LaF_3$ layer was formed as the first dielectric layer 4 on the reflective layer 3 by sputtering using a $ZrO_2$—$SiO_2$—$Cr_2O_3$—$LaF_3$ target (ratio of number of molecules 23:23:31:23). The thickness of the dielectric layer 4 varied from sample to sample. The thickness of the dielectric layer 4 was selected from a range of 3 nm to 40 nm, so that the reflectance which enabled the recording and reproduction to be carried out stably depending on the composition of the recording layer was ensured and the contrast was maximized. Further, the recording layer 5 of the Te—O—Pd—Cu material having a thickness of 20 nm was formed by sputtering using a target consisting of Te—Pd—Cu. The composition of the recording layer varied from sample to sample, and the composition is shown in Table 2. Next, a ZnS—$SiO_2$ layer was formed as the second dielectric layer 6 on the recording layer 5 by sputtering using a ZnS—$SiO_2$ target (ratio of number of molecules 80:20). The first dielectric layer was formed so that the refractive index was from 1.6 to 2.8. The thickness of the second dielectric layer 6 varied from sample to sample and was selected from a range of 3 nm to 40 nm so that the dielectric layer had an optimal refractive index and an optimal extinction coefficient depending on the composition of the recording layer. Further the second dielectric layer was formed so that the refractive index was from 1.6 to 2.8.

In the film formation step of each layer, a target having a diameter of 100 mm and a thickness of about 6 mm was used. A power source and an output used in the film-formation step of each layer were a DC power source and 200 W for the reflective layer, an RF power source and 300 W for the dielectric layer, and the DC power source and 100 W for the recording layer. Further, the film formations of the reflective layer and the dielectric layers were carried out in a gas atmosphere of Ar 25 sccm, keeping a gas pressure at 0.13 Pa. The film formation of the recording layer was carried out in a mixed-gas atmosphere of Ar 25 sccm and oxygen, keeping the gas pressure at about 0.13 Pa. An ultraviolet-curable resin (an acrylic resin) which is transparent to the laser beam was applied to the surface of the second dielectric layer 6 by a spin coat method after the layer 6 was formed, resulting in the formation of the optical transparent layer having a thickness of 100 μm. Thus, the manufacturing of the information recording medium 1 was completed.

Samples of which compositions of the recording layers were different from each other were manufactured for investigating the dependence of the signal characteristics of the recording medium on the composition of the recording material. The Te content, the Pd content and the Cu content were adjusted by adjusting the composition of the sputtering target. The O content in the recording layer was adjusted by adjusting the amount of the $O_2$ gas in the atmosphere gas in which the sputtering was conducted.

Next, the evaluation method of the information recording medium is described. In order to record information on the information recording medium 1, an information recording system of general constitution was used, which was equipped with a spindle motor 69 for rotating the information recording medium 1, an optical head equipped with a semiconductor laser which emitted the laser beam 65, and an objective lens 66 which focused the laser beam 65 on the recording layer of the information recording medium 1. In the evaluation of the recorded signal, the C/N ratio of the single signal was evaluated with a spectrum analyzer and a jitter value was evaluated with a time interval analyzer. In the evaluation of the information recording medium 1, a semiconductor laser having a wavelength of 405 nm and an objective lens having a numerical aperture of 0.85 were used and 25 GB, 30 GB and 33.4 GB size data per face were recorded on each sample. The linear velocity at which the information recording medium was rotated was 19.68 m/s (144 Mbps, corresponding to BD 4× (4-fold) speed) upon recording any size data.

The C/N ratio was evaluated according to the following procedures. The laser beam is applied, using the system as described above, to the information recording medium 1 with the power modulated between a peak power of a high power level and a bias power of a low power level, and the single signal having a mark length of 2T was recorded once onto the groove surface of the recording layer with the spectrum analyzer. Then, the C/N ratio was determined. Here, when the C/N ratio of more than 43 dB was obtained, it was evaluated as "⊚" because very good signal quality could be obtained; when the C/N ratio of more than 40 dB but 43 dB or less was obtained, it was evaluated as "○" because good signal quality could be obtained; when the C/N ratio of more than 38 dB but 40 dB or less was obtained, it was evaluated as "Δ" because the signal quality had a bit of problem; and when the C/N ratio of 38 dB or less was obtained, it was evaluated as "×" because the signal quality was not good.

The recording sensitivity was evaluated according to the following procedures. Here, random signals having mark lengths of 2T to 8T were recorded once on the groove surface of the recording layer using the above-mentioned system, and an average jitter was determined. The average jitter was determined on each recording condition with the ratio of the bias power to the peak power being fixed while the peak power was varied. The peak power at which the average jitter value was minimal was determined and this determined value was recording sensitivity. The recording was conducted at a 4× (four-fold) speed (144 Mbps). When the recording sensitivity was 8 mW or less, it was evaluated as "⊚"; when the recording sensitivity was more than 8 mW but 9 mW or less, it was evaluated as "○"; when the recording sensitivity was more than 9 mW but 10 mW or less, it was evaluated as "Δ"; and when the recording sensitivity was more than 10 mW, it was evaluated as "×." The comprehensive evaluation was evaluated using the ratings "⊚", "○", "△" and "×" such that the lowest evaluation among the CN ratio, the recording sensitivity, the change in reflectance and the cost when 25 GB size data was recorded was reflected. For example, the comprehensive evaluation of Sample 1 was "×" since the cost was "×." The comprehensive evaluation of Sample 8 was "△" since the change in reflectance was "△."

The change in reflectance was determined in the following conditions. The accelerated test was conducted by keeping the information recording medium in an atmosphere wherein a temperature was 85° C. and a humidity was 85% RH for 50 hours. The change in reflectance was evaluated by determining the change rate of reflectance before and after the accelerated test {(100×(initial reflectance)−(reflectance after the accelerated test)}/initial reflectance). Here, when the change rate of reflectance was 5% or less, it was evaluated as "⊚"; when the change rate was more than 5% but 15% or less, it was evaluated as "○"; when the change rate was more than 15% but 25% or less, it was evaluated as "△"; and when the change rate was more than 25%, it was evaluated as "×."

The cost evaluation was made based on the cost required for forming the recording layer, although the cost varies depending on a yield and a period of time for film forming. In other words, it can be said that as the amount of Pd contained in the recording layer is smaller, it is more advantageous for cost. Here, when the content of Pd in the recording layer was 10 atom % or less, it was evaluated as "⊚"; when the content of Pd was more than 10 atom % but 15 atom % or less, it was evaluated as "○"; and when the content of Pd was more than 15 atom %, it was evaluated as "×."

Next, a method for determining elementary ratio (the content of each atom) in the recording layer is described. A sample for compositional analysis is made for determining the ratios of the elements in the recording layer of the information recording medium by means of an X-ray microanalyzer. The sample for compositional analysis was made by forming a layer of the Te—O-$M_A$-$M_B$ material having a thickness of 500 nm on a Si substrate having a thickness of 1 mm using the sputtering target and the film formation conditions used for forming the recording layer in each information recording medium sample. The results analyzed by this method is shown as the composition of the recording layer in each information recording medium sample. This was applied also in the following examples.

In Example 1, the information recording medium wherein the recording layer was made from the Te—O—Pd—Cu material was manufactured as shown in Table 2 and the evaluations described above were conducted. The information recording medium wherein the recording layer was made from the Te—O—Pd material as a comparative example was evaluated similarly. The evaluation results are shown in Table 2.

TABLE 2

| Sample | Composition of Recording Layer [atom %] | | | | CN ratio | | | Recording Sensitivity | Change in Reflectance | Cost | Comprehensive Evaluation |
|---|---|---|---|---|---|---|---|---|---|---|---|
| | Te | O | Pd | Cu | 25 GB per face | 30 GB per face | 33.4 GB per face | | | | |
| 1 | 21 | 39 | 20 | 20 | △ | △ | △ | ⊚ | ⊚ | X | X |
| 2 | 25 | 45 | 15 | 15 | ○ | ○ | ○ | ⊚ | ⊚ | ○ | ○ |
| 3 | 28 | 52 | 10 | 10 | ⊚ | ○ | ○ | ⊚ | ⊚ | ⊚ | ⊚ |
| 4 | 32 | 58 | 5 | 5 | ⊚ | ⊚ | ⊚ | ⊚ | ⊚ | ⊚ | ⊚ |
| 5 | 33 | 61 | 3 | 3 | ⊚ | ⊚ | ⊚ | ⊚ | ⊚ | ⊚ | ⊚ |
| 6 | 35 | 63 | 1 | 1 | ○ | ○ | ○ | △ | X | ⊚ | X |
| 7 | 28 | 52 | 5 | 15 | ⊚ | ⊚ | ⊚ | ⊚ | ○ | ⊚ | ○ |
| 8 | 30 | 53 | 2 | 15 | ⊚ | ⊚ | ⊚ | ⊚ | △ | ⊚ | △ |
| 9 | 28 | 52 | 15 | 5 | ⊚ | ○ | ○ | ⊚ | ⊚ | ○ | ○ |
| 10 | 30 | 53 | 15 | 2 | ⊚ | ○ | ○ | ⊚ | △ | ○ | △ |
| 11 | 45 | 35 | 10 | 10 | △ | △ | △ | ⊚ | ⊚ | ⊚ | △ |
| 12 | 7 | 75 | 10 | 10 | X | X | X | X | ⊚ | ⊚ | X |
| 13 | 55 | 25 | 10 | 10 | X | X | X | ⊚ | ⊚ | ⊚ | X |
| 14 | 34 | 46 | 20 | 0 | ○ | ○ | ○ | ⊚ | △ | X | X |
| 15 | 36 | 49 | 15 | 0 | ⊚ | ○ | ○ | ⊚ | △ | ○ | △ |
| 16 | 38 | 52 | 10 | 0 | ⊚ | ⊚ | ⊚ | ⊚ | △ | ⊚ | △ |
| 17 | 40 | 55 | 5 | 0 | ⊚ | ⊚ | ⊚ | ○ | △ | ⊚ | △ |

As shown in Table 2, the evaluation of the C/N ratio, the recording sensitivity, and the change in reflectance (and the cost) varied when the composition of the recording layer varied, as to the information recording mediums wherein the recording layers were formed from Te—O—Pd—Cu or Te—O—Pd.

When the recording layer was formed from Te—O—Pd (Samples 14, 15, 16 and 17), the change in reflectance was large. On the other hand, when the recording layer was formed from Te—O—Pd—Cu and the content of Pd and the content of Cu in the recording layer was less than 3 atom % (Sample 6), low evaluations were given as to the C/N ratio, the recording sensitivity and the change in reflectance. Further, when the content of Pd and the content of Cu was over 15 atom % (Sample 1), low evaluations were given as to the C/N ratio and the cost.

Further, when the ratio of the Cu content to the sum of the Pd content and the Cu content was 0.25 or more but 0.75 or less, there was no problem in the change in reflectance. When this ratio was out of this range (Samples 8 and 10 in Example 1), the change in reflectance was large.

Further, when the O content in the recording layer was over 70 atom % (Sample 12), low evaluations were given as to the C/N ratio and the recording sensitivity. When the O content was 40 atom % or less (Sample 11), low evaluation was given as to the C/N ratio.

Further, when the Te content in the recording layer was over 50 atom % (Sample 13), low evaluation was given as to the C/N ratio.

When the ratio of the $M_B$ atom content to the sum of the $M_A$ atom content ($X_A$) and the $M_B$ atom content ($X_B$) ($X_B/(X_A+$ $X_B$)) was less than 0.25 (Sample 10) or over 0.75 (Sample 8), the change in reflectance was slightly large.

Accordingly, it is considered that the Te—O-$M_A$-$M_B$ material having a composition wherein the content of Te atom is from 10 atom % to 50 atom %, the content of O atom is from 40 atom % to 70 atom %, the content of $M_A$ atom is from 3 atom % to 15 atom %, and the content of $M_B$ atom is from 3 atom % to 15 atom % is suitable for forming the recording layer from the viewpoints of the C/N ratio, the recording sensitivity, the change in reflectance and the cost. Further, when the Te—O-$M_A$-$M_B$ material having a composition wherein the content of $M_A$ atom is from 3 atom % to 10 atom % and the content of $M_B$ atom is from 3 atom % to 10 atom % was used, good results were obtained for all of the C/N ratio, the recording sensitivity, the change in reflectance and the cost (Samples 3 to 5: the comprehensive evaluations of these samples were "⊚"). Therefore, it can be said that the material of such a composition is particularly preferable to form the recording layer. Further, when the Te—O—Pd—Cu material having a composition wherein the content of Pd atom was from 3 atom % to 5 atom % was used, good C/N ratio, that is, good signal quality was be able to be obtained even in the case of recording information at higher recording density (30 GB per face to 33.4 GB per face).

It was confirmed, from the results of Examples, that the low-cost information recording medium which showed good signal quality and enabled the recorded data to be reproduced stably for a long period of term could be realized, when the composition of the Te—O-$M_A$-$M_B$ material constituting the recording layer was selected so that the content of Te atom was from 10 atom % to 50 atom %, the content of O atom was from 40 atom % to 70 atom %, the content of $M_A$ atom was from 3 atom % to 15 atom %, and the content of $M_B$ atom was from 3 atom % to 15 atom %. Further, it was confirmed that the information recording medium which showed particularly good characteristics could be realized when the composition of the Te—O-$M_A$-$M_B$ material constituting the recording layer was selected so that the content of Te atom was from 10 atom % to 50 atom %, the content of O atom was from 40 atom % to 70 atom %, the content of $M_A$ atom was from 3 atom % to 10 atom %, and the content of $M_B$ atom was from 3 atom % to 10 atom %. Furthermore, it was confirmed that the information recording medium which showed particularly good signal quality and enabled high-density recording (30 GB to 33.4 GB per face), when the composition of the Te—O—Pd—Cu material constituting the recording layer was selected so that the content of Pd atom was from 3 atom % to 5 atom %.

Example 2

In Example 2, the effect on the C/N ratio, the recording sensitivity, the change in reflectance and the cost by the recording material was investigated when the Te—O—Pd—Ag material, the Te—O—Pd—Ni material, the Te—O—Au—Ag material, the Te—O—Au—Ni material and the Te—O—Au—Cu material were used as the recording material. The information recording mediums were produced in the same manner as that employed in Example 1 and the evaluation conditions were the same as those employed in Example 1. The results of evaluation of samples are shown in Table 3.

TABLE 3

| Sample | Composition of Recording Layer [atom %] | C/N ratio 25 GB per face | C/N ratio 30 GB per face | C/N ratio 33.4 GB per face | Recording Sensitivity | Change in Reflectance | Cost | Comprehensive Evaluation |
|---|---|---|---|---|---|---|---|---|
| 18 | Te:O:Pd:Ag = 32:58:5:5 | ⊚ | ⊚ | ⊚ | ⊚ | ⊚ | ⊚ | ⊚ |
| 19 | Te:O:Pd:Ni = 32:58:5:5 | ⊚ | ⊚ | ⊚ | ⊚ | ⊚ | ⊚ | ⊚ |
| 20 | Te:O:Au:Ag = 32:58:5:5 | ⊚ | ⊚ | ⊚ | ⊚ | ⊚ | ⊚ | ⊚ |
| 21 | Te:O:Au:Ni = 32:58:5:5 | ⊚ | ⊚ | ⊚ | ⊚ | ⊚ | ⊚ | ⊚ |
| 22 | Te:O:Au:Cu = 32:58:5:5 | ⊚ | ⊚ | ⊚ | ⊚ | ⊚ | ⊚ | ⊚ |

As shown in Table 3, good results were obtained for all of the C/N ratio, the recording sensitivity, the change in reflectance and the cost similarly to Example 1, when the Te—O—Pd—Ag material, the Te—O—Pd—Ni material, the Te—O—Au—Ag material, the Te—O—Au—Ni material and the Te—O—Au—Cu material were used as the recording material.

It was confirmed, from the results of this example, that the recording mediums wherein the recording layers were formed from the Te—O—Pd—Ag material, the Te—O—Pd—Ni material, the Te—O—Au—Ag material, the Te—O—Au—Ni material and the Te—O—Au—Cu material had the characteristics similar to those of the recording medium wherein the recording layer was formed from the Te—O—Pd—Cu material.

Example 3

In Example 3, the Te—O-$M_A$-$M_B$ material (here, the Te—O—Pd—Cu was used as a representative example) and the Te—O—Pd were applied to the information recording medium consisting of two information layers and the composition of the recording layer, the C/N ratio, the recording sensitivity and the change in reflectance were evaluated similarly to Example 1.

The information recording medium having a constitution shown in FIG. 2 was produced. A substrate of a polycarbonate resin was used as the substrate 10. The substrate had a diameter of 12 cm and a thickness of 1.1 mm and a groove guide on one surface. The guide groove had a groove pitch of 0.32 µm and a groove depth of 20 nm.

The first information layer 15 was formed on the groove-formed surface of the substrate 10. The constitution of the first information layer 15 was made so that it had the reflective layer 14, the first dielectric layer 12, the recording layer 13 and the second dielectric layer 14. Firstly, an AgPdCu reflective layer 11 having a thickness of 80 nm was formed by sputtering using an AgPdCu (weight ratio of 98.1:0.9:1.0) target. Next, a ZrO$_2$—SiO$_2$—Cr$_2$O$_3$—LaF$_3$ dielectric layer 12 having a thickness of 10 nm (the refractive index: 1.98)

Example 1. The evaluation results of the information recording mediums (Samples 23 and 24) manufactured in this example are shown in Table 4.

TABLE 4

| | | Composition of Recording Layer [atom %] | | | | C/N ratio | | | | | |
|---|---|---|---|---|---|---|---|---|---|---|---|
| Sample | Information Layer | Te | O | Pd | Cu | 25 GB per face | 30 GB per face | 33.4 GB per face | Recording Sensitivity | Change in Reflectance | Comprehensive Evaluation |
| 23 | First Information Layer | 38 | 52 | 10 | 0 | ◎ | ◎ | ◎ | ◎ | △ | ◎ |
| | Second Information Layer | 38 | 52 | 10 | 0 | ◎ | ○ | ○ | ◎ | △ | |
| 24 | First Information Layer | 32 | 58 | 5 | 5 | ◎ | ◎ | ◎ | ◎ | ◎ | ◎ |
| | Second Information Layer | 32 | 58 | 5 | 5 | ◎ | ◎ | ◎ | ◎ | ◎ | | was formed by sputtering using a ZrO$_2$—SiO$_2$—Cr$_2$O$_3$—LaF$_3$ target (ratio of number of molecules 23:23:31:23). Next, the recording layer 13 of the Te—O—Pd—Cu material (Sample 24) or the Te—O—Pd material (Sample 23) having a thickness of 20 nm was formed using the target consisting of Te—Pd—Cu or Te—Pd. Next, a ZnS—SiO$_2$ dielectric layer 14 having a thickness of 5 nm (the refractive index: 2.30) was formed by sputtering using a ZnS—SiO$_2$ target (ratio of number of molecules 80:20).

An ultraviolet curable resin (an acrylic resin) was applied to the surface of the first information layer 15 by the spin coat method. Next, a plate having convexities and concavities complementary to the shape of the guide groove formed in the substrate was adhered to the ultraviolet curable resin. The ultraviolet curable resin was cured with the plate adhered to the resin and then the plate was removed. Thereby, the intermediate layer 16 having a thickness of about 25 μm and the guide groove was formed.

Next, the second information layer 21 was formed on the surface of the intermediate layer 16. The constitution of the second information layer 21 was made so that it had the reflective layer 17, the first dielectric layer 18, the recording layer 19, and the second dielectric layer 20. Firstly, an AgPdCu reflective layer 17 having a thickness of 12 nm was formed by sputtering using an AgPdCu (weight ratio of 98.1:0.9:1.0) target. Next, a ZrO$_2$—SiO$_2$—Cr$_2$O$_3$—LaF$_3$ dielectric layer 18 having a thickness of 14 nm (the refractive index: 1.98) was formed by sputtering using a ZrO$_2$—SiO$_2$—Cr$_2$O$_3$—LaF$_3$ target (ratio of number of molecules 23:23:31:23). Next, the recording layer 19 of Te—O—Pd—Cu (Sample 24) or Te—O—Pd (Sample 23) having a thickness of 12 nm was formed using the target consisting of Te—Pd—Cu or Te—Pd. Next, a ZnS—SiO$_2$ dielectric layer 20 having a thickness of 10 nm (the refractive index: 2.30) was formed by sputtering using a ZnS—SiO$_2$ target (ratio of number of molecules 80:20). The optical transparent layer 22 having a thickness of 75 μm was formed on the surface of this second information layer by the spin coat method using an ultraviolet curable resin (an acrylic resin). The composition of the recording layer was similar to the Sample 4 in Example 1. The film formation conditions of each layer, the method for analyzing the composition of the recording layer, the methods for evaluating the C/N ratio, the recording sensitivity and the change in reflectance were the same as those employed in As shown in Table 4, when the recording layers of the first information layer and the second information layer were made from the Te—O—Pd—Cu material which has a compositional ratio of Te:O:Pd:Cu=32:58:5:5 (atom %), good evaluation results were obtained for the C/N ratio, the recording sensitivity and the change in reflectance similarly to Sample 4 in Example 1.

Further, the comparison of the C/N ratio of Samples 23 and 24 showed that no difference in the C/N ratio due to the difference of the composition was observed in the first information layer, but difference in the C/N ratio due to the difference of the composition occurred in the second information layer. Specifically, better C/N ratio was obtained in Sample 24 wherein the second information layer was formed from the Te—O—Pd—Cu material having a compositional ratio of Te:O:Pd:Cu=32:58:5:5 (atom %).

Here, the evaluation results are shown for the sample wherein the recording layer has a composition of Te:O:Pd:Cu=32:58:5:5 (atom %). It was confirmed that the same tendency was shown when the recording layers of the first information layer and the second information layer were formed from the materials of other compositions used in Examples 1 and 2.

It was confirmed, from the results of this example, that the two-layered information recording medium showing good signal quality could be realized when the composition of the Te—O-M$_A$-M$_B$ material constituting the recording layer was selected so that the content of Te atom was from 10 atom % to 50 atom %, the content of O atom was from 40 atom % to 70 atom %, the content of M$_A$ atom was from 3 atom % to 15 atom %, and the content of M$_B$ atom was from 3 atom % to 15 atom %. Further, it was confirmed that when the recording layer of the Te—O-M$_A$-M$_B$ material was placed on the laser-entry side in the multilayered information recording medium, more excellent C/N ratio was given compared to the Te—O—Pd material.

Example 4

In Example 4, the Te—O-M$_A$-M$_B$ material (here, Te—O—Pd—Cu was used as a representative example) was applied to the information recording medium consisting of three information layers, and the C/N ratio, the recording sensitivity and the change in reflectance were evaluated.

The information recording medium having a structure shown in FIG. 3 was manufactured. A substrate of polycarbonate resin was used as the substrate 25. The substrate had a diameter of 12 cm and a thickness of 1.1 mm and a guide groove on one surface. The guide groove had a groove pitch of 0.32 μm and a groove depth of 20 nm.

The first information layer 30 was formed on the groove-formed surface of the substrate 25. The constitution of the first information layer was made so that it had the reflective layer 26, the first dielectric layer 27, the recording layer 28 and the second dielectric layer 29. Firstly, an AgPdCu reflective layer 26 having a thickness of 80 nm was by sputtering using an AgPdCu (weight ratio of 98.1:0.9:1.0) target. Next, a $ZrO_2$—$SiO_2$—$Cr_2O_3$—$LaF_3$ dielectric layer 27 having a thickness of 10 nm (the refractive index: 1.98) was formed by sputtering using a $ZrO_2$—$SiO_2$—$Cr_2O_3$—$LaF_3$ target (ratio of number of molecules 23:23:31:23). Next, the recording layer 28 of the Te—O—Pd—Cu material having a thickness of 20 nm was formed by sputtering using a target consisting of Te—Pd—Cu. Next, a ZnS—$SiO_2$ dielectric layer 29 having a thickness of 10 nm (the refractive index: 2.30) was formed by sputtering using a ZnS—$SiO_2$ target (ratio of number of molecules 80:20).

An ultraviolet curable resin (an acrylic resin) was applied to the surface of the first information layer 30 by the spin coat method. Next, a plate having convexities and concavities complementary to the shape of the guide groove formed in the substrate was adhered to the ultraviolet curable resin. The ultraviolet curable resin was cured with the plate adhered to the resin and then the plate was removed. Thereby, the intermediate layer 31 having a thickness of about 25 μm and the guide groove was formed.

The second information layer 36 was formed on the surface of the intermediate layer 31. The constitution of the second information layer 36 was made so that it had the reflective layer 32, the first dielectric layer 33, the recording layer 34, and the second dielectric layer 35. Firstly, an AgPdCu reflective layer 32 having a thickness of 12 nm was formed by sputtering using an AgPdCu (weight ratio of 98.1:0.9:1.0) target. Next, a $ZrO_2$—$SiO_2$—$Cr_2O_3$—$LaF_3$ dielectric layer 33 having a thickness of 14 nm (the refractive index: 1.98) was formed by sputtering using a $ZrO_2$—$SiO_2$—$Cr_2O_3$—$LaF_3$ target (ratio of number of molecules 23:23:31:23). Next, the recording layer 34 of the Te—O—Pd—Cu material having a thickness of 10 nm was formed by sputtering using the target consisting of Te—Pd—Cu. Next, a ZnS—$SiO_2$ dielectric layer 35 having a thickness of 11 nm (the refractive index: 2.30) was formed by sputtering using a ZnS—$SiO_2$ target (ratio of number of molecules 80:20).

The intermediate layer 37 having a thickness of about 18 μm was formed on the surface of this second information layer 36. The intermediate layer 37 was formed in the same manner as the intermediate layer 31.

The third information layer 41 was formed on the surface of this intermediate layer 37. The constitution of the third information layer 41 was made so that it had the first dielectric layer 38, the recording layer 39 and the second dielectric layer 40. Firstly, an AlN dielectric layer 38 having a thickness of 15 nm (the refractive index: 2.05) was formed by sputtering using an AlN target. Next, the recording layer 39 of the Te—O—Pd—Cu material having a thickness of 12 nm was formed using the target consisting of Te—Pd—Cu. Next, a ZnS—$SiO_2$ dielectric layer 40 having a thickness of 41 nm (the refractive index: 2.30) was formed by sputtering using a ZnS—$SiO_2$ target (ratio of number of molecules 80:20). The optical transparent layer 42 having a thickness of about 57 μm was formed using an ultraviolet curable resin (an acrylic resin) on the surface of this third information layer 41 by the spin coat method. The composition of the recording layer was identical to that of Sample 4 in Example 1. The film formation conditions of each layer, and the method for analyzing the composition of the recording layer were the same as those employed in Example 1.

In this Example, 34 GB size data per layer was recorded upon evaluating the C/N ratio, the recording sensitivity, and the change in reflectance. Specifically, the recording and reproduction was conducted using the semiconductor laser of 405 nm wavelength and the objective lens having a numerical aperture of 0.85 which were used in Example 1, and the signal detection was conducted using PR12221ML. The evaluation results of the information recording medium (Sample 25) are shown in Table 5.

TABLE 5

| Sample | Information Layer | Composition of Recording Layer [atom %] | | | | C/N ratio | | | Recording Sensitivity | Change in Reflectance | Comprehensive Evaluation |
|---|---|---|---|---|---|---|---|---|---|---|---|
| | | Te | O | Pd | Cu | 25 GB per face | 30 GB per face | 33.4 GB per face | | | |
| 25 | First | 32 | 58 | 5 | 5 | ⊚ | ⊚ | ⊚ | ⊚ | ⊚ | ⊚ |
| | Second | 32 | 58 | 5 | 5 | ⊚ | ⊚ | ⊚ | ⊚ | ⊚ | |
| | Third | 32 | 58 | 5 | 5 | ⊚ | ⊚ | ⊚ | ⊚ | ⊚ | |

As shown in Table 5, when the recording layers of the first information layer, the second information layer and the third information layer were made from the Te—O—Pd—Cu material which has a compositional ratio of Te:O:Pd:Cu=32:58:5:5 (atom %), good evaluation results were obtained for the C/N ratio, the recording sensitivity and the change in reflectance similarly to Sample 4 in Example 1.

Here, the evaluation results are shown for the sample wherein the recording layer has a composition of Te:O:Pd:Cu=32:58:5:5 (atom %). It was confirmed that the same tendency was shown when the first, the second and the third information layers were formed from the materials having other compositions used in Examples 1 and 2.

It was confirmed, from the results of this example, that the three-layered information recording medium showing good signal quality could be realized when the composition of the Te—O-$M_A$-$M_B$ material constituting the recording layer was selected so that the content of Te atom was from 10 atom % to 50 atom %, the content of O atom was from 40 atom % to 70 atom %, the content of $M_A$ atom was from 3 atom % to 15 atom %, and the content of $M_B$ atom was from 3 atom % to 15 atom %.

Example 5

In Example 5, the Te—O-$M_A$-$M_B$ material (here, Te—O—Pd—Cu was used as a representative example) was applied to the information recording medium consisting of four information layers, and the C/N ratio, the recording sensitivity and the change in reflectance were evaluated, similarly to Example 1.

The information recording medium shown in FIG. 4 (n=4) was manufactured. A substrate of a polycarbonate resin was used as the substrate 44. The substrate had a diameter of 12 cm and a thickness of 1.1 mm and a guide groove on one surface. The guide groove had a groove pitch of 0.32 μm and a groove depth of 20 nm.

The first information layer 50 was formed on the groove-formed surface of the substrate 44. The constitution of the first information layer was made so that it had the reflective layer 46, the first dielectric layer 47, the recording layer 48 and the second dielectric layer 49. Firstly, an AgPdCu reflective layer 46 having a thickness of 80 nm was by sputtering using an AgPdCu (weight ratio of 98.1:0.9:1.0) target. Next, a $ZrO_2$—$SiO_2$—$Cr_2O_3$—$LaF_3$ dielectric layer 47 having a thickness of 10 nm (the refractive index: 2.05) was formed by sputtering using a $ZrO_2$—$SiO_2$—$Cr_2O_3$—$LaF_3$ target (ratio of number of molecules 23:23:31:23). Next, the recording layer 48 of the Te—O—Pd—Cu material having a thickness of 30 nm was formed using a target consisting of Te—Pd—Cu. Next, a ZnS—$SiO_2$ dielectric layer 49 having a thickness of 10 nm (the refractive index: 2.30) was formed by sputtering using a ZnS—$SiO_2$ target (ratio of number of molecules 80:20).

An ultraviolet curable resin (an acrylic resin) was applied to the surface of the first information layer by a spin coat method. Next, a plate having convexities and concavities complementary to the shape of the guide groove formed in the substrate was adhered to the ultraviolet curable resin. The ultraviolet curable resin was cured with the plate adhered to the resin, and then the plate was removed. Thereby, the intermediate layer 51 having a thickness of about 13.5 μm and the guide groove was formed.

The second information layer 55 was formed on the surface of the intermediate layer 51. The constitution of the second information layer was made so that it had the first dielectric layer 52, the recording layer 53 and the second dielectric layer 54. Firstly, an AlN dielectric layer 52 having a thickness of 5 nm (the refractive index: 2.05) was formed using an AlN target. Next, the recording layer 53 of the Te—O—Pd—Cu material having a thickness of 17 nm was formed by sputtering using the target consisting of Te—Pd—Cu. Next, a ZnS dielectric layer 54 having a thickness of 20 nm (the refractive index: 2.52) was formed by sputtering using a ZnS target. The intermediate layer 56 having a thickness of about 17.5 μm and a guide groove was formed on the surface of this second information layer 55. The intermediate layer 56 was formed in the same manner as the intermediate layer 51.

The third information layer was formed on the surface of this intermediate layer. The constitution of the third information layer was made so that it had the first dielectric layer, the recording layer and the second dielectric layer. Firstly, an AlN dielectric layer having a thickness of 10 nm (the refractive index: 2.05) was formed by sputtering using a AlN target. Next, the recording layer of the Te—O—Pd—Cu material having a thickness of 10.5 nm was formed using the target consisting of Te—Pd—Cu. Next, a ZnS—$SiO_2$ dielectric layer having a thickness of 33 nm (the refractive index: 2.30) was formed by sputtering using a ZnS—$SiO_2$ target (ratio of number of molecules 80:20). An intermediate layer having a thickness of about 9.5 μm and a guide groove was formed on the surface of the third information layer. The intermediate layer was formed in the same manner as the intermediate layer 51.

The fourth information layer 60 was formed on the surface of this intermediate layer. The constitution of the fourth information layer 60 was made so that it had the first dielectric layer 57, the recording layer 58 and the second dielectric layer 59. Firstly, an AlN dielectric layer 57 having a thickness of about 15 nm (the refractive index; 2.05) was formed by sputtering using an AlN target. Next, the recording layer 58 of the Te—O—Pd—Cu material having a thickness of 7.5 nm was formed by sputtering using the target consisting of Te—Pd—Cu. Next, a ZnS—$SiO_2$ dielectric layer 59 having a thickness of 46 nm (the refractive index: 2.30) was formed by sputtering using a ZnS—$SiO_2$ target (ratio of number of molecules 80:20). The optical transparent layer 61 having a thickness of about 59.5 μm was formed on the surface of this fourth information layer by the spin coat method using an ultraviolet curable resin (an acrylic resin).

The composition of the recording layer was identical to that of Sample 4 in Example 1. The film form conditions of each layer, the method for analyzing the composition of the recording layer, the methods for evaluating the C/N ratio, the recording sensitivity and the change in reflectance were the same as those employed in Example 1. The evaluation results of the information recording medium (Sample 26) manufactured in this example are shown in Table 6.

TABLE 6

| Sample | Information Layer | Composition of Recording Layer [atom %] | | | | C/N ratio | | | Recording Sensitivity | Change in Reflectance | Comprehensive Evaluation |
|---|---|---|---|---|---|---|---|---|---|---|---|
| | | Te | O | Pd | Cu | 25 GB per face | 30 GB per face | 33.4 GB per face | | | |
| 26 | First | 32 | 58 | 5 | 5 | ◎ | ◎ | ◎ | ◎ | ◎ | ◎ |
| | Second | 32 | 58 | 5 | 5 | ◎ | ◎ | ◎ | ◎ | ◎ | |
| | Third | 32 | 58 | 5 | 5 | ◎ | ◎ | ◎ | ◎ | ◎ | |
| | Fourth | 32 | 58 | 5 | 5 | ◎ | ◎ | ◎ | ◎ | ◎ | |

As shown in Table 6, when the recording layers of the first information layer, the second information layer, the third information layer and the fourth information layer were made from the Te—O—Pd—Cu material which had a compositional ratio of Te:O:Pd:Cu=32:58:5:5 (atom %), good evaluation results were obtained for the C/N ratio, the recording sensitivity and the change in reflectance similarly to Sample 4 in Example 1.

Here, the evaluation results are shown for the sample wherein the recording layer has a composition of Te:O:Pd:Cu=32:58:5:5 (atom %). It was confirmed that the same tendency was shown when the first, the second, the third and the fourth information layers were formed from the materials of other compositions used in Examples 1 and 2.

It was confirmed, from the results of this example, that the four-layered information recording medium showing good signal quality could be realized when the composition of the Te—O—$M_A$—$M_B$ material constituting the recording layer was selected so that the content of Te atom was from 10 atom % to 50 atom %, the content of O atom was from 40 atom % to 70 atom %, the content of $M_A$ atom was from 3 atom % to 15 atom %, and the content of $M_B$ atom was from 3 atom % to 15 atom %.

Example 6

In Example 6, the Te—O—$M_A$—$M_B$ material (here, Te—O—Pd—Cu was used as a representative example) was applied to the information recording medium consisting of six information layers and the C/N ratio, the recording sensitivity and the change in reflectance were evaluated, similarly to Example 1.

The information recording medium having a structure shown in FIG. 4 (n=6) was produced. A substrate of a polycarbonate resin was used as the substrate 44. The substrate had a diameter of 12 cm and a thickness of 1.1 mm and a guide groove on one surface. The guide groove had a groove pitch of 0.32 μm and a groove depth of 20 nm.

The first information layer 50 was formed on the groove-formed surface of the substrate 44. The constitution of the first information layer was made so that it had the reflective layer 46, the first dielectric layer 47, the recording layer 48 and the second dielectric layer 49. Firstly, an AgPdCu reflective layer 46 having a thickness of 80 nm was formed by sputtering using an AgPdCu (weight ratio of 98.1:0.9:1.0) target. Next, a $ZrO_2$—$SiO_2$—$Cr_2O_3$—$LaF_3$ dielectric layer 47 having a thickness of 20 nm (the refractive index: 1.98) was formed by sputtering using a $ZrO_2$—$SiO_2$—$Cr_2O_3$—$LaF_3$ target (ratio of number of molecules 23:23:31:23). Next, the recording layer 48 of Te—O—Pd—Cu having a thickness of 20 nm was formed by sputtering using a target consisting of Te—Pd—Cu. Next, a ZnS—$SiO_2$ dielectric layer 49 having a thickness of 20 nm (the refractive index: 2.30) was formed by sputtering using a ZnS—$SiO_2$ target (ratio of number of molecules 80:20).

An ultraviolet curable resin (an acrylic resin) was applied to the surface of the first information layer 50 by the spin coat method. Next, a plate having convexities and concavities complementary to the shape of the guide groove formed in the substrate was adhered to the ultraviolet curable resin. The ultraviolet curable resin was cured with the plate adhered to the resin, and then the plate was removed. Thereby, the intermediate layer 51 having a thickness of about 20.0 μm and the guide groove was formed.

The second information layer 55 was formed on the surface of the intermediate layer 51. The constitution of the second information layer 55 was made so that it had the first dielectric layer 52, the recording layer 53 and the second dielectric layer 54. Firstly, an AlN dielectric layer 52 having a thickness of 5 nm was formed by sputtering using an AlN target. Next, the recording layer 53 of the Te—O—Pd—Cu material having a thickness of 15 nm was formed using the target consisting of Te—Pd—Cu. Next, a ZnS dielectric layer having a thickness of 5 nm (the refractive index: 2.52) was formed by sputtering using a ZnS target. Next, a $TiO_2$ dielectric layer having a thickness of 18 nm (the refractive index: 2.68) was formed by sputtering using a $TiO_2$ target. That is, the second dielectric layer 54 was of a two-layered structure consisting of the ZnS dielectric layer and the $TiO_2$ dielectric layer. The intermediate layer 56 having a thickness of 23.0 μm and a guide groove was formed on the surface of this second information layer 55. The intermediate layer 56 was formed in the same manner as the intermediate layer 51.

A third information layer was formed on this intermediate layer 56. The constitution of the third information layer was made so that it had the first dielectric layer, the recording layer and the second dielectric layer. Firstly, an AlN dielectric layer having a thickness of 10 nm (the refractive index: 2.05) was formed by sputtering using an AlN target. Next, the recording layer of the Te—O—Pd—Cu material having a thickness of 8 nm was formed by sputtering using the target consisting of Te—Pd—Cu. Next, a ZnS—$SiO_2$ dielectric layer having a thickness of 39 nm (the refractive index: 2.30) was formed by sputtering using a ZnS—$SiO_2$ target (ratio of number of molecules 80:20). An intermediate layer having a thickness of about 13.0 μm and a guide groove was formed on the surface of this third information layer. The intermediate layer was formed in the same manner as the intermediate layer 51.

A fourth information layer was formed on the surface of the intermediate layer. The constitution of the fourth information layer was made so that it had the first dielectric layer, the recording layer and the second dielectric layer. Firstly, an AlN dielectric layer having a thickness of 10 nm (the refractive index: 2.05) was formed by sputtering using an AlN target. Next, the recording layer of the Te—O—Pd—Cu material having a thickness of 5 nm was formed by sputtering using the target consisting of Te—Pd—Cu. Next, a ZnS—$SiO_2$ dielectric layer having a thickness of 53 nm (the refractive index: 2.30) was formed by sputtering using a ZnS—$SiO_2$ target (ratio of number of molecules 80:20). An intermediate layer having a thickness of about 17.0 μm and a guide groove was formed on this fourth information layer. The intermediate layer was formed in the same manner as the intermediate layer 51.

A fifth information layer was formed on the surface of this intermediate layer. The constitution of the fifth information layer was made so that it had the first dielectric layer, the recording layer and the second dielectric layer. Firstly, an AlN dielectric layer having a thickness of 15 nm (the refractive index: 2.05) was formed by sputtering using an AlN target. Next, the recording layer of the Te—O—Pd—Cu material having a thickness of 5 nm was formed by sputtering using the sputtering target consisting of Te—Pd—Cu. Next, a ZnS—$SiO_2$ dielectric layer having a thickness of 54 nm (the refractive index: 2.30) was formed by sputtering using a ZnS—$SiO_2$ target (ratio of number of molecules 80:20). An intermediate layer having a thickness of about 10.0 μm and a guide groove was formed on the surface of this fifth information layer. An intermediate layer was formed in the same manner as the intermediate layer 51.

The sixth information layer 60 was formed on the surface of this intermediate layer. The constitution of the sixth information layer 60 was made so that it had the first dielectric layer 57, the recording layer 58 and the second dielectric layer 59. Firstly, an AlN dielectric layer 57 having a thickness of about 15 nm (the refractive index; 2.05) was formed by sputtering using an AlN target. Next, the recording layer 58 of the Te—O—Pd—Cu material having a thickness of 4 nm was formed by sputtering using the target consisting of Te—Pd—Cu. Next, a ZnS—$SiO_2$ dielectric layer 59 having a thickness of 57 nm (the refractive index: 2.30) was formed by sputtering using a ZnS—$SiO_2$ target (ratio of number of molecules 80:20). The optical transparent layer 61 having a thickness of about 37.0 μm was formed on the surface of this sixth information layer by the spin coat method using an ultraviolet curable resin (an acrylic resin).

The composition of each recording layer was the same as that of Sample 4 in Example 1. The film formation conditions of each layer, the method for analyzing the composition of the recording layer, the methods for evaluating the C/N ratio, the recording sensitivity and the change in reflectance were the same as those employed in Example 1. The evaluation results of the information recording medium (Sample 27) manufactured in this example are shown in Table 7.

TABLE 7

| Sample | Information Layer | Composition of Recording Layer [atom %] | | | | C/N ratio | | | Recording Sensitivity | Change in Reflectance | Comprehensive Evaluation |
|---|---|---|---|---|---|---|---|---|---|---|---|
| | | Te | O | Pd | Cu | 25 GB per face | 30 GB per face | 33.4 GB face | | | |
| 27 | First | 32 | 58 | 5 | 5 | ⊚ | ⊚ | ⊚ | ⊚ | ⊚ | ⊚ |
| | Second | 32 | 58 | 5 | 5 | ⊚ | ⊚ | ⊚ | ⊚ | ⊚ | |
| | Third | 32 | 58 | 5 | 5 | ⊚ | ⊚ | ⊚ | ⊚ | ⊚ | |
| | Fourth | 32 | 58 | 5 | 5 | ⊚ | ⊚ | ⊚ | ⊚ | ⊚ | |
| | Fifth | 32 | 58 | 5 | 5 | ⊚ | ⊚ | ⊚ | ⊚ | ⊚ | |
| | Sixth | 32 | 58 | 5 | 5 | ⊚ | ⊚ | ⊚ | ⊚ | ⊚ | |

As shown in Table 7, when the recording layers of the first information layer, the second information layer, the third information layer, the fourth information layer, the fifth information layer, and the sixth information layer were made from the Te—O—Pd—Cu material having a compositional ratio of Te:O:Pd:Cu=32:58:5:5 (atom %), good evaluation results were obtained for the C/N ratio, the recording sensitivity and the change in reflectance similarly to Sample 4 in Example 1.

Here, the evaluation results are shown for the sample wherein the recording layer has a composition of Te:O:Pd:Cu=32:58:5:5 (atom %). It was confirmed that the same tendency was shown when the recording layers of the first, the second, the third, the fourth, the fifth and the sixth information layers were formed from the materials of other compositions used in Examples 1 and 2.

It was confirmed, from the results of this example, that the four-layered information recording medium showing good signal quality could be realized when the composition of the Te—O-$M_A$-$M_B$ material constituting the recording layer was selected so that the content of Te atom was from 10 atom % to 50 atom %, the content of O atom was from 40 atom % to 70 atom %, the content of $M_A$ atom was from 3 atom % to 15 atom %, and the content of $M_B$ atom was from 3 atom % to 15 atom %

Example 7

In Example 7, the effect on the C/N ratio by the thickness of the recording layer was investigated when the Te—O—Pd—Cu material was used as the recording material. The information recording medium was produced by the same method employed in Example 1 and the evaluation conditions were the same as those employed in Example 1. The evaluation results of Samples 28-34 of which thicknesses of the recording layers were different from each other are shown in Table 8.

TABLE 8

| Sample | Thickness of Recording Layer | C/N ratio | | |
|---|---|---|---|---|
| | | 25 GB per face | 30 GB per face | 33.4 GB per face |
| 28 | 1 nm | Δ | Δ | Δ |
| 29 | 2 nm | ○ | ○ | ○ |
| 30 | 5 nm | ○ | ○ | ○ |
| 31 | 10 nm | ⊚ | ⊚ | ⊚ |
| 32 | 30 nm | ⊚ | ⊚ | ⊚ |
| 33 | 50 nm | ○ | ○ | ○ |
| 34 | 60 nm | Δ | Δ | Δ |

As shown in Table 8, the C/N ratio varied depending on the thickness of the recording layer with respect to the information recording medium wherein the recording layer was made from the Te—O—Pd—Cu material.

According to Table 8, when the thickness of the recording layer was less than 2 nm (Sample 28), the C/N ratio was low. It is considered that this is because the recording layer was not a continuous layer. When the thickness of the recording layer was in a range of 2 nm to 50 nm (Samples 29-33), the recording material easily formed the continuous layer and good C/N ratio was obtained. In particular, when the thickness of the recording layer was in a range of 10 nm to 30 nm (Samples 31-32), more excellent C/N ratio was obtained since sufficient optical change was obtained and the thermal diffusion in the plane was small. When the thickness of the recording layer was over 50 nm (Sample 34), the C/N ratio was lowered since the thermal diffusion in the plane of the recording layer was large. Accordingly, it is considered that the suitable thickness of the recording layer containing the Te—O-$M_A$-$M_B$ material is 2 nm or more but 50 nm or less considering the C/N ratio.

Here, the example wherein the Te—O—Pd—Cu material was used as the recording material is described. It was confirmed that the same characteristics were obtained when the Te—O—Pd—Ag material, the Te—O—Pd—Ni material, the Te—O—Au—Ag material, the Te—O—Au—Ni material and the Te—O—Au—Cu material were used.

The suitable thickness of the recording layer in the first information layer in the information recording medium having two information layers shown in FIG. 2 was from 2 nm to 50 nm similarly. On the other hand, it was found that the suitable thickness of the recording layer in the second information layer was from 2 nm to 30 nm since the second information layer was required to have high transmittance.

The suitable thickness of the recording layer in the first information layer was likewise from 2 nm to 50 nm in the information recording medium having three information layers shown in FIG. 3. On the other hand, it was found that the suitable thickness of the recording layer in the second information layer was from 2 nm to 30 nm since the second information layer was required to have high transmittance and high reflectance. Further, it was found that the suitable thickness of the recording layer in the third information layer was from 2 nm to 20 nm since the third information layer was required to have high transmittance.

In the information recording medium having a constitution shown in FIG. 4 wherein n is four, the suitable thickness of the recording layer in the first information layer was likewise from 2 nm to 50 nm. On the other hand, it was found that the suitable thicknesses of the recording layers in the second to the fourth information layers were from 2 nm to 20 nm since these information layers are required to have high transmittance.

In the information recording medium having a constitution shown in FIG. 4 wherein n is six, the suitable thickness of the recording layer in the first information layer was likewise from 2 nm to 50 nm. On the other hand, it was found that the suitable thicknesses of the recording layers in the second to the sixth information layers were from 2 nm to 20 nm since these information layers are required to have high transmittance.

It was confirmed, from the results of this example, that when the recording medium has only one information layer, the information recording medium showing good signal quality could be realized by forming the recording layer to have a thickness of from 2 nm to 50 nm. Further, it was confirmed that when the recording medium had two information layers, the information recording medium showing good signal quality could be realized by forming the recording layer in the information layer which is on the back side viewed from the laser entry side to have a thickness of from 2 nm to 50 nm, and forming the recording layer in the information layer which in on the near side viewed from the laser entry side to have a thickness of from 2 nm to 30 nm.

Further, it was confirmed that when the recording medium had three information layers, the information recording medium showing good signal quality could be realized by forming the recording layer in the first information layer to have a thickness of from 2 nm to 50 nm, forming the recording layer in the second information layer to have a thickness of from 2 nm to 30 nm, and forming the recording layer to have a thickness of from 2 nm to 20 nm. Furthermore, it was confirmed that when the recording medium had n information layers (wherein n is an integer of 4 or more), the information recording medium showing good signal quality could be realized by forming the recording layer in the first information layer to have a thickness of from 2 nm to 50 nm, and forming the recording layers in the second to the "n"th information layers to have a thickness of from 2 nm to 20 nm.

Industrial Applicability

The information recording medium according to the present invention and the production method thereof according to the present invention are useful as a DVD-R disc and a BD-R disc which are the write-once information recording mediums and the production method thereof.

The invention claimed is:

1. An information recording medium comprising a substrate and an information layer having a recording layer, on and from which information is recorded and reproduced by irradiation of laser beam, wherein:
the recording layer comprises a Te—O-$M_A$-$M_B$ material consisting of Te, O, $M_A$, wherein $M_A$ is at least one element selected from Au and Pd, and $M_B$, wherein $M_B$ is at least one element selected from Ag, Cu and Ni,
a content of Te atom is from 10 atom % to 50 atom %, a content of O atom is from 40 atom % to 70 atom %, a content of $M_A$ atom is from 3 atom % to 15 atom %, and a content of $M_B$ atom is from 3 atom % to 15 atom % in the Te—O-$M_A$-$M_B$ material, and
a ratio of the content of $M_B$ atom to a total of the content of $M_A$ atom ($X_A$) and the content of $M_B$ atom ($X_B$)($X_B$/($X_A$+$X_B$)) is from 0.25 to 0.75 in the Te—O-$M_A$-$M_B$ material.

2. The information recording medium according to claim 1, wherein $M_A$ atom is Pd.

3. The information recording medium according to claim 2, wherein a content of Pd is from 3 atom % to 5 atom %.

4. The information recording medium according to claim 1, wherein $M_B$ atom is Cu.

5. The information recording medium according to claim 2, wherein $M_B$ atom is Cu.

6. The information recording medium according to claim 1, wherein a thickness of the recording layer is from 2 nm to 50 nm.

7. The information recording medium according to claim 1, comprising two or more information layers, wherein at least one of the two or more information layers comprises the recording layer comprising the Te—O-$M_A$-$M_B$ material.

8. The information recording medium according to claim 1, wherein the laser beam has a wavelength of from 350 nm to 500 nm.

9. The information recording medium according to claim 7, wherein the laser beam has a wavelength of from 350 nm to 500 nm.

10. A method for producing the information recording medium according to claim 1, wherein a step of forming the recording layer comprises sputtering with a sputtering target containing a material consisting of Te, O, $M_A$, wherein $M_A$ is at least one element selected from Au and Pd, and $M_B$, wherein $M_B$ is at least one element selected from Ag, Cu and Ni, in an atmosphere containing a rare gas.

11. A method for producing the information recording medium according to claim 1, wherein a step of forming the recording layer comprises reactive sputtering with a sputtering target containing a material consisting of Te, $M_A$, wherein $M_A$ is at least one element selected from Au and Pd, and $M_B$, wherein $M_B$ is at least one element selected from Ag, Cu and Ni, in an atmosphere containing a mixed gas of a rare gas and oxygen.

12. A recording and reproduction apparatus for an information recording medium, which comprises a spindle motor for rotating the information recording medium comprising a recording layer, an optical head provided with a semiconductor laser emitting laser beam and an objective lens focusing the laser beam on the recording layer,
wherein the recording layer comprises a Te—O-$M_A$-$M_B$ material consisting of Te, O, $M_A$, wherein $M_A$ is at least one element selected from Au and Pd, and $M_B$, wherein $M_B$ is at least one element selected from Ag, Cu and Ni, in which a content of Te atom is from 10 atom % to 50 atom %, a content of O atom is from 40 atom % to 70 atom %, a content of $M_A$ atom is from 3 atom % to 15 atom %, and a content of $M_B$ atom is from 3 atom % to 15atom % in the Te—O-$M_A$-$M_B$ material, and
a ratio of the content of $M_B$ atom to a total of the content of $M_A$ atom ($X_A$) and the content of $M_B$ atom ($X_B$)($X_B$/($X_A$+$X_B$)) is from 0.25 to 0.75 in the Te—O-$M_A$-$M_B$ material.

13. The recording and reproduction apparatus for an information recording medium according to claim 12, wherein a wavelength of the laser beam is from 350 nm to 500 nm.

14. An information recording medium comprising a substrate and an information layer having a recording layer, on and from which information is recorded and reproduced by irradiation of laser beam, wherein:
the recording layer comprises a Te—O-$M_A$-$M_B$ material consisting of Te, O, $M_A$, wherein $M_A$ is at least one element selected from Au and Pd, and $M_B$, wherein $M_B$ is Cu, and
a content of Te atom is from 10 atom % to 50 atom %, a content of O atom is from 40 atom % to 70 atom %, a content of $M_A$ atom is from 3 atom % to 15 atom %, and a content of $M_B$ atom is from 5 atom % to 15 atom % in the Te—O-$M_A$-$M_B$ material.

15. A recording and reproduction apparatus for an information recording medium, which comprises a spindle motor for rotating the information recording medium comprising a recording layer, an optical head provided with a semiconductor laser emitting laser beam and an objective lens focusing the laser beam on the recording layer, wherein the recording layer comprises a Te—O-$M_A$-$M_B$ material consisting of Te, O, $M_A$, wherein $M_A$ is at least one element selected from Au and Pd, and $M_B$, wherein $M_B$ is Cu, in which a content of Te atom is from 10 atom % to 50 atom %, a content of O atom is from 40 atom % to 70 atom %, a content of $M_A$ atom is from 3 atom % to 15 atom %, and a content of $M_B$ atom is from 5 atom % to 15 atom % in the Te—O-$M_A$-$M_B$ material.

16. An information recording medium comprising a substrate and an information layer having a recording layer, on and from which information is recorded and reproduced by irradiation of laser beam, wherein:

the recording layer comprises a Te—O-$M_A$-$M_B$ material consisting of Te, O, $M_A$, wherein $M_A$ is at least one element selected from Au and Pd, and $M_B$, wherein $M_B$ is Ni, and a content of Te atom is from 10 atom % to 50 atom %, a content of O atom is from 40 atom % to 70 atom %, a content of $M_A$ atom is from 3 atom % to 15 atom %, and a content of $M_B$ atom is from 3 atom % to 15 atom % in the Te—O-$M_A$-$M_B$ material.

17. A recording and reproduction apparatus for an information recording medium, which comprises a spindle motor for rotating the information recording medium comprising a recording layer, an optical head provided with a semiconductor laser emitting laser beam and an objective lens focusing the laser beam on the recording layer, wherein the recording layer comprises a Te—O-$M_A$-$M_B$ material consisting of Te, O, $M_A$, wherein $M_A$ is at least one element selected from Au and Pd, and $M_B$, wherein $M_B$ is Ni, in which a content of Te atom is from 10 atom % to 50 atom %, a content of O atom is from 40 atom % to 70 atom %, a content of $M_A$ atom is from 3 atom % to 15 atom %, and a content of $M_B$ atom is from 3 atom % to 15 atom % in the Te—O-$M_A$-$M_B$ material.

* * * * *